United States Patent
Kündig et al.

(10) Patent No.: US 10,047,759 B2
(45) Date of Patent: Aug. 14, 2018

(54) METHOD FOR CONTROLLING THE SPEED OF CRYOGENIC COMPRESSORS ARRANGED IN SERIES FOR COOLING CRYOGENIC HELIUM

(71) Applicant: LINDE AKTIENGESELLSCHAFT, Munich (DE)

(72) Inventors: Andres Kündig, Dietikon (CH); Can Üresin, Winterthur (CH)

(73) Assignee: LINDE AKTIENGESELLSCHAFT, Munich (DE)

( * ) Notice: Subject to any disclaimer, the term of this patent is extended or adjusted under 35 U.S.C. 154(b) by 12 days.

(21) Appl. No.: 15/322,752

(22) PCT Filed: Jul. 2, 2015

(86) PCT No.: PCT/EP2015/001342
§ 371 (c)(1),
(2) Date: Dec. 29, 2016

(87) PCT Pub. No.: WO2016/005038
PCT Pub. Date: Jan. 14, 2016

(65) Prior Publication Data
US 2017/0152855 A1    Jun. 1, 2017

(30) Foreign Application Priority Data

Jul. 8, 2014    (DE) ........................ 10 2014 010 104

(51) Int. Cl.
| | |
|---|---|
| *F04D 27/00* | (2006.01) |
| *F04D 19/02* | (2006.01) |
| *G05B 15/02* | (2006.01) |
| *F25B 9/00* | (2006.01) |
| *F04D 17/12* | (2006.01) |
| *F04D 23/00* | (2006.01) |
| *F25B 49/02* | (2006.01) |

(52) U.S. Cl.
CPC .......... *F04D 27/004* (2013.01); *F04D 17/12* (2013.01); *F04D 19/02* (2013.01); *F04D 23/003* (2013.01);
(Continued)

(58) Field of Classification Search
None
See application file for complete search history.

(56) References Cited

U.S. PATENT DOCUMENTS

| | | | |
|---|---|---|---|
| 4,640,665 A | 2/1987 | Staroselsky et al. | |
| 4,698,080 A * | 10/1987 | Gray ...................... | F25J 1/0244 62/175 |

(Continued)

FOREIGN PATENT DOCUMENTS

| | | |
|---|---|---|
| DE | 1993202 A1 | 1/2001 |
| GB | 2480270 A * | 11/2011 .......... F04D 27/0261 |

OTHER PUBLICATIONS

Control for Cryogenic Turboexpanders; 6 pages; Jacobson et al.; Published Feb. 1, 2014.*

*Primary Examiner* — Ronald D Hartman, Jr.
(74) *Attorney, Agent, or Firm* — Millen White Zelano & Branigan, PC

(57) ABSTRACT

A method for controlling speeds of compressors arranged in series for compressing a fluid. The desired inlet pressure is predefined and the actual inlet pressure is detected. The actual discharge pressure of the fluid is recorded and the actual total pressure ratio is recorded. A proportional integral value is determined from the deviation of the actual inlet pressure from the desired inlet pressure and a capacity factor is determined from the proportional integral value and the actual total pressure ratio. A model total pressure ratio is determined from the actual total pressure ratio and the capacity factor. A reduced desired speed for each compressor is determined as a function value of the control function associated with the respective compressor. The control function assigns a reduced desired speed to each value pair of capacity factor and model total pressure ratio and is used to adjust the speed of each compressor.

12 Claims, 19 Drawing Sheets

Figure 1:
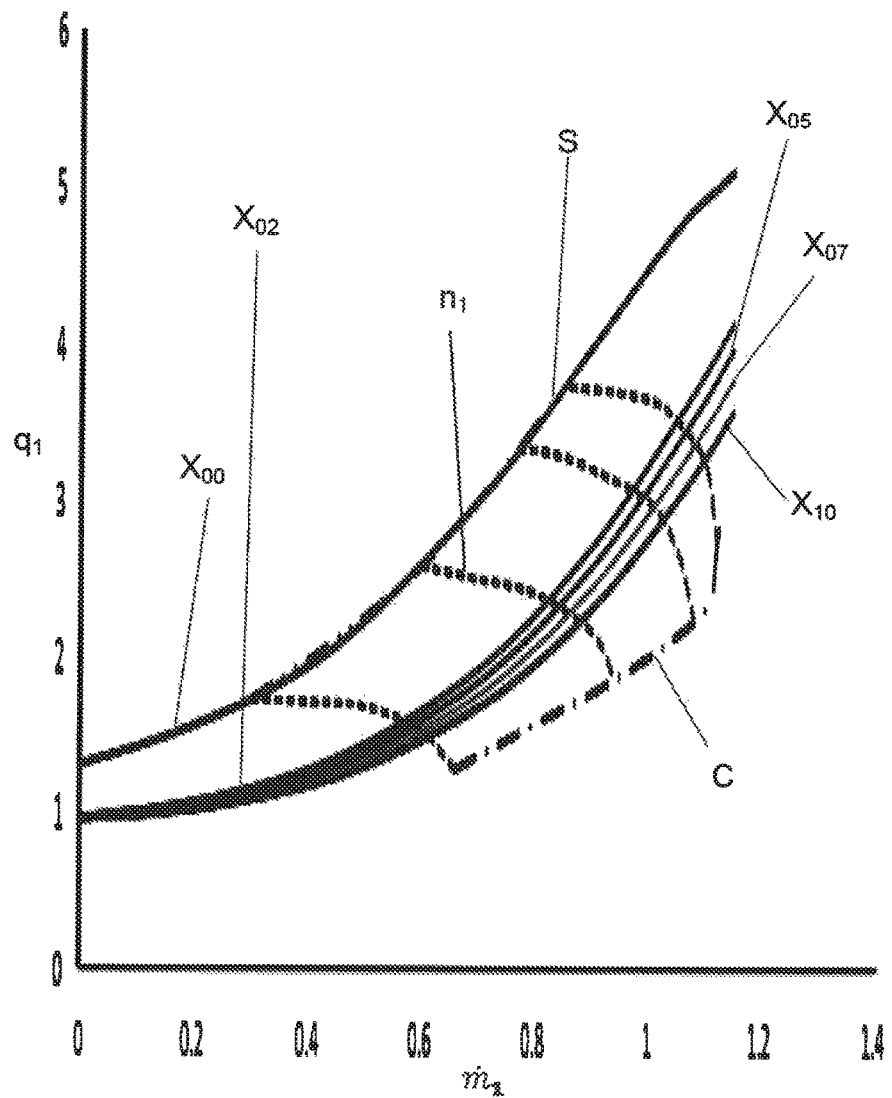

(52) U.S. Cl.
CPC ......... *F04D 23/005* (2013.01); *F04D 27/001* (2013.01); *F25B 9/002* (2013.01); *F25B 49/022* (2013.01); *G05B 15/02* (2013.01); *F25B 2600/0253* (2013.01); *F25B 2700/1931* (2013.01); *F25B 2700/1933* (2013.01)

(56) References Cited

U.S. PATENT DOCUMENTS

| | | | | |
|---|---|---|---|---|
| 5,499,505 A | * | 3/1996 | Gistau-Baguer | F25B 9/00 62/228.3 |
| 2003/0014985 A1 | * | 1/2003 | Dresens | B01D 8/00 62/149 |
| 2003/0019224 A1 | * | 1/2003 | Vander Woude | F17C 7/04 62/186 |
| 2005/0178134 A1 | * | 8/2005 | Gistau-Baguer | F25B 1/053 62/228.1 |
| 2015/0044061 A1 | * | 2/2015 | Hutten | F04D 25/06 417/42 |
| 2016/0053764 A1 | * | 2/2016 | Abdelwahab | F04D 27/004 417/53 |
| 2016/0377041 A1 | * | 12/2016 | Steffen | F02D 19/0644 123/495 |
| 2017/0159666 A1 | * | 6/2017 | Uresin | F04D 27/006 |
| 2017/0219265 A1 | * | 8/2017 | Barjhoux | F25B 45/00 |

* cited by examiner

METHOD FOR CONTROLLING THE SPEED OF CRYOGENIC COMPRESSORS ARRANGED IN SERIES FOR COOLING CRYOGENIC HELIUM

The invention relates to a method for controlling speeds of compressors arranged in series for compressing a fluid, in particular cryogenic helium.

Such compressors, in particular turbo compressors, are known from the prior art and typically have a shaft having at least one impeller (compressor wheel) or rotor blades directly connected to the shaft, by means of which the fluid is compressed during the rotation of the shaft. In the context of the present invention, the speed of the compressor is understood to mean the number of full rotations (360°) of the shaft about the shaft axis per unit of time. Compressors, such as turbo compressors, are subdivided, in particular, into radial compressors and axial compressors. In the case of a radial compressor, the fluid flows in axially to the shaft and is deflected in a radially outward direction. In the case of an axial compressor, however, the fluid to be compressed flows in through the compressor in a direction parallel to the shaft.

In some cooling systems, extreme cooling between 1.8K and 4K by means of liquid and in particular by means of superfluid helium is required. Said temperatures fall into the so-called low cryogenic temperature range between 1.8K and 2.2K. During the cooling of such systems, a varying amount of helium evaporates, depending on the load on the system. Usually, the vapor pressure of such systems is between 15 mbar and 50 mbar. Depending on the load applied to the system, the evaporation rate of the helium used for cooling increases or decreases, which leads to different pressures via the liquid phase of the helium. In order to adjust the vapor pressure to a nearly constant value, so-called compressor systems are used, which usually comprise a number of radial compressors and/or turbo compressors, also called turbo blowers. Turbo compressors have a performance map, which limits the mass flow upwards and downwards in case of a given speed and a given suction state at the entry of the compressor. The upper limit is given by reaching the Mach number 1 in the inside of the blade row of the compressor. This limit is referred to as a choke characteristic in the performance map. The efficiency of a compressor in the choke operation drops dramatically. The lower limit is defined by the breakaway of the mass flow rate at the blade edges of the compressor, which appears as vibration and leads to an—undesired—instant pressure equalization above the compressor. This phenomenon is referred to as surging. The corresponding characteristic in the performance map of the compressor is referred to as a pump characteristic or surge characteristic. A return from the surge state to the normal operating state is then possible by means of a bypass, which provides the respective compressor with a sufficiently large mass flow, such that the compressor reassumes operation within the performance map. Nevertheless, said effect is undesirable, since the profitability of the system is adversely affected as a consequence.

Controlling compressors that are connected in series is difficult, in particular because the controlling of a compressor impacts the state/control needs of the subsequent compressor. Temperature variations and pressure variations at the system inlet may increase from stage to stage, i.e. from the preceding to the downstream compressor. Compressor systems furthermore operate at a suction temperature of approximately 4K. At these temperatures, the specific heat of metal is very low and therefore temperature fluctuations in such compressors, which are made of metal, can occur very rapidly. However, since said temperature variations, are highly relevant with regards to interferences, the volatility of such compressor systems increases significantly.

Radial compressor connected in series are used in various applications for overcoming greater pressure conditions. Each compressor connected in series has its own performance map (also referred to as operation map) and must be controlled such that the compressor operates as efficiently and safely as possible within its performance map. When a compressor connected in series is, for example, controlled by changing the speed of the compressor, other factors/states around said compressor change as well, such as the intake pressure, or the mass flow, etc., whereby the states around other compressors in the series are affected. In order to smoothen the impact of operating point fluctuations, the speed controls of turbo compressors convert real values into so-called reduced values. Reduced values are generated by a suitable normalization of dimensionless variables. Thus a dimensionless reduced mass flow can be determined, for example, which is advantageous for model calculations, for example. Likewise, the variable of the speed can be converted into a reduced speed. In order to calculate said reduced variables, the variable per se is required (i.e., for example the mass flow or the speed of the compressor), as well as the temperature, the pressure, and the set values (also referred to as design specifications) of the compressors. The set values are the operating conditions of a compressor in which the compressor operates with the greatest efficiency (in the most profitable manner). Compressors have set values, for example, with respect to the speed, the mass flow, the temperature, and the pressure above the respective compressor. The goal is to operate the compressors of the series close to their design points. The calculation of reduced values is described in various turbo machine journals and books (e.g. "Design of Radial Turbomachines—A. Whitfield, N. C. Baines").

Such a multi-step, cryogenic turbo compressor system must be controlled via a very efficient control to enable the stable and uninterrupted operation thereof.

Such a control must be capable of controlling each compressor in a manner such that the compressor on the one hand is driven stably and economically in the performance map of the compressor, and furthermore the controller must be designed such that at the same time all other compressors in the series are operating in stable and economical operation states.

This object is achieved by the method according to the invention, which method comprises the following steps:

Setting a desired inlet pressure which the fluid should have at an entry of the compressor arranged the furthest upstream, Recording an actual inlet pressure of the fluid on said entry, Recording an actual discharge pressure of the fluid at an output of the compressor arranged the farthest downstream, Establishing an actual total pressure ratio, wherein the actual total pressure ratio corresponds to the quotient from the actual discharge pressure and the actual inlet pressure, Determining a proportional integral value based on the deviation of the actual inlet pressure from the desired inlet pressure, Determining the capacity factor of the proportional integral value and the actual total pressure ratio, Establishing a model total pressure ratio based on the actual total pressure ratio and the capacity factor, Determining a reduced desired speed for each compressor, wherein the respective reduced desired speed is determined as a function value of a control function associated with the respective compressor, which control function assigns a reduced desired speed to each value pair consisting of capacity factor and model total pressure ratio, and Determining a desired speed for each reduced desired speed and adjusting the speed of each compressor to the desired speed determined for the respective compressor.

In the method according to the invention it is particularly advantageous that a fluctuation in the pressure at the output of the compressor arranged the furthest downstream is not passed on to the entry of the compressor system, i.e. the fluctuation is dampened by the control, whereby in particular an experiment which requires said low temperatures is protected, for example, by using superconductive solenoid coils, and the cooling is ensured at a constant temperature.

Particularly advantageous in this type of control is the fact that the entire compressor series is in particular controlled with only two control variables, namely the capacity factor and the model total pressure ratio.

The model total pressure ratio is calculated based on the actual total pressure ratio and serves in particular to be able to control the operating states of the compressors, even if the capacity factor is at its maximum value or its minimum value, i.e. is in saturation. Said limits are set, for example, by surge or choke operating states. A low capacity factor causes, according to the invention, in particular operating states close to surge states, while a high capacity factor causes in particular operating states close to the choke states.

For example, all operating states lying on the surge characteristic or close to the surge line can be assigned to the capacity factor 0, and all operating states, which are in particular on or close to the choke characteristic, can be assigned to a capacity factor of 1. Said operating states are, however, undesirable, such that the value range of the capacity factor is usually limited, such that neither surge operating states nor choke operating states can be achieved. A typical value range of the capacity factor extends in particular from 0.05 to 0.9. Hereby, in particular pressures currently present at the entry or the output of the respective compressor are referred to as actual pressures.

The compressors arranged in series compress the fluid successively along a flow direction that runs in the direction of increasing pressures. Both, the actual pressures and the temperatures at the compressor can be determined by means of appropriate instruments or methods, wherein in particular the temperatures at the respective entry of the compressors are necessary to calculate the reduced variables such as, for example, the reduced desired speed. Furthermore, the proportional integral value can be determined in the usual manner, in particular using a so-called PI controller. For that purpose, on the one hand a so-called proportional value and on the other hand an integral value is calculated, wherein the proportional value is in particular proportional to the difference between desired and actual inlet pressure, and the integral value is in particular calculated by means of an integration based on all or some proportional values determined in the past, A reduced desired speed or a reduced speed is to be understood as a reduced variable, as above. For a conversion into a dimensionful (absolute control) variable, said reduced variable must first be re-transformed. This is done based on formulas listed down below.

Each compressor is associated with a control function, which establishes the required desired speed based on the actual total pressure ratio and the capacity factor. The basis of each control function is the entirety of all compressor characteristics and the compressibility of the fluid to be compressed. The control function is preferably based on the assumption that the fluid is sufficient over the entire temperature range and pressure range of the compressor series of the ideal gas equation:

$$pV=RT$$

According to an advantageous embodiment of the invention, the proportional integral value can be at most as large as the sum of the logarithm of a design total pressure ratio and a choke capacity factor, wherein the choke capacity factor is in particular 1, and wherein the design total pressure ratio is the total pressure ratio that results when all compressors of the series are operated at their design points, wherein the design point of a compressor defines in particular the operating state (for example, represented by a point in the performance map of the compressor), at which operating state the compressor has the highest efficiency.

The choke capacity factor is in particular the capacity factor, which would drive a compressor close to or on a choke operating state or a choke characteristic.

In an advantageous embodiment of the invention, the capacity factor corresponds to the difference of the proportional integral value and the natural logarithm of the actual total pressure ratio. This is in particular the case if the control of the compressor occurs in a region where the capacity factor is not in saturation.

Preferably, a maximum value and a minimum value for the capacity factor is defined, wherein in particular the maximum value is between 0.8 and 1, preferably at 0.9 and/or wherein the minimum value is preferably between 0 and 0.1, preferably at 0.05.

In a further variant of the invention, the model total pressure ratio according to the invention corresponds to the actual total pressure ratio multiplied by a saturation function dependent on the capacity factor, wherein the saturation function is in particular 1 when the capacity factor is between the minimum value and the maximum value, and wherein the saturation function is in particular formed by an exponential function of the difference of the capacity factor and the minimum value when the capacity factor is less than the minimum value, and the saturation function is in particular given by an exponential function of the difference of the capacity factor and the maximum value when the capacity factor is greater than the maximum value.

For the presentation and the calculations, in particular the natural logarithm of the respective total pressure ratio is used instead of the total pressure ratio. This is a completely equivalent presentation.

The model total pressure ratio can thus be represented by formulas as follows:

$$\ln(\pi_{model})=\ln(\pi_{actual})$$

This applies in particular, if the capacity factor is between the minimum value and maximum value, wherein $\pi_{model}$ is the model total pressure ratio and $\pi_{actual}$ is the actual total pressure ratio.

The saturation function SF for values of the capacity factor that are not between the minimum value and the maximum value can, for example, be indicated by $$SF=\exp(0.5*(X-X_{max})) \text{ for } X>X_{max}$$

$$\text{or } SF=\exp(0.5*(X-X_{min})) \text{ for } X<X_{min},$$

wherein X is the capacity factor and $X_{min}$ is the minimum factor and $X_{max}$ is the maximum factor of the capacity factor. Thus, the following results:

$$\pi_{model} = \pi_{actual} * SF <=> \ln(\pi_{model}) = \ln(\pi_{actual}) + 0.5*(X - X_{min/max})$$

Said modification of the model total pressure ratio ensures that in operating states in which the capacity factor is in saturation, the control continues to impact the compressor, because then instead of the capacity factor, the model total pressure ratio is changed, such that the control function can invoke reduced desired speeds that lead out of said operating states.

In a particularly preferred embodiment of the invention, the capacity factor is equated with the maximum value (in particular after the model total pressure ratio was determined), if the capacity factor is greater than the maximum value. Furthermore, if the capacity factor is less than the minimum value, the capacity factor is preferably equated to the minimum value (in particular after the model total pressure ratio was determined). This serves, in particular, to prevent capacity factors from being given to the control function, which would possibly be harmful for the operation of the compressor. Consequently, $X=X_{min}$ or $X=X_{max}$ applies in particular in said cases.

In a variant of the invention, the discharge temperature of the fluid at the output of the respective compressor is equal to the inlet temperature of the fluid at the entry of the compressor of the series respectively arranged downstream of the respective compressor, and the discharge pressure of the fluid at the output of the respective compressor is substantially equal to the inlet pressure of the fluid at the entry of the compressor of the series respectively arranged downstream of the respective compressor. Deviations between the said temperatures may occur, for example, due to heat impact from the environment, etc. Deviations between said pressures may arise, for example, due to pressure losses along the pipelines.

In a preferred embodiment of the invention, the outlet temperature and the outlet pressure for each compressor according to the invention is determined based on the inlet pressure and the inlet temperature of the compressor of the series arranged the furthest upstream, in particular by means of a turbo machine equation and in particular pre-calculated, such that in particular the reduced speed for each compressor and a reduced mass flow are determined by the respective compressor as a function of the total pressure ratio, and in particular of the capacity factor, wherein the overall pressure ratio is then, in the same manner as the actual total pressure ratio, by the quotient of the outlet pressure of the compressor arranged the furthest downstream and the inlet pressure of the compressor of the series arranged the furthest upstream. Establishing reduced desired speeds during operation is greatly simplified by creating a table (a so-called look-up table).

The reduced mass flow is a reduced variable, as is the reduced speed, which implicitly includes the temperature of the mass flow through a transformation of the (real or absolute) mass flow. The reduced mass flow can therefore change in particular as a function of the temperature. Turbo machine equations are flow equations that are especially suitable for the description of flows in turbo machines, which also includes compressors. Said turbo machine equations are so-called Euler equations, in particular Euler turbo machine equations or Euler turbo compressor equations.

In particular preferred is the definition of five capacity lines for each compressor, wherein each capacity line is a function for each compressor of the total pressure ratio and in particular a function of the reduced mass flow and of the reduced speed of the respective compressor, and wherein the capacity factor along the respective capacity line for each compressor is in particular constant.

In a preferred variant of the invention, the control function establishes the reduced desired speed for each compressor based on a pre-calculated table, wherein the table for each capacity factor, which lies on a capacity line, and for each total pressure ratio, comprises the respective reduced speed, and wherein in particular for capacity factors as well as for total pressure ratios, which are not listed in the table, the corresponding values for the reduced speeds of the respective compressor are established by means of an interpolation method. Such an interpolation method is, for example, a "nearest neighbor" interpolation. Such a table can, in this context, in particular also be considered a function. Alternatively, the control function can also be given by polynomials, in which the polynomials define in particular the progress of the capacity lines.

Preferably, the capacity lines display those value pairs consisting of the reduced mass flow and of the reduced speed that effect the equalization of the actual inlet pressure and the desired inlet pressure when the control function of the model total pressure ratio and the capacity factor determine a reduced desired speed for each compressor, in particular from the pre-calculated table, and the control is performed by means of the established reduced speeds.

In a preferred embodiment, the capacity lines are arranged between a surge characteristic and a choke characteristics, wherein the surge characteristic comprises operating states of the respective compressor, where—in case of a given reduced speed and a given reduced mass flow—an individual pressure ratio to be achieved cannot be maintained, and wherein the choke characteristic comprises operational states of the compressor, in which—in the case of a determined reduced desired revolution speed of the respective compressor—a reduction of the respective individual pressure ratio does not result in an increased mass flow through the respective compressor. The individual pressure ratio of a compressor corresponds to the quotient of the discharge pressure at the output of the respective compressor and the inlet pressure at the entry of each compressor.

Further details and advantages of the invention shall be illustrated by the following Figure descriptions of exemplary embodiments by means of Figures. Shown are FIG. 1: Performance map with capacity lines of a first compressor, which is arranged the furthest upstream of four compressors connected in series.

Figure 2:
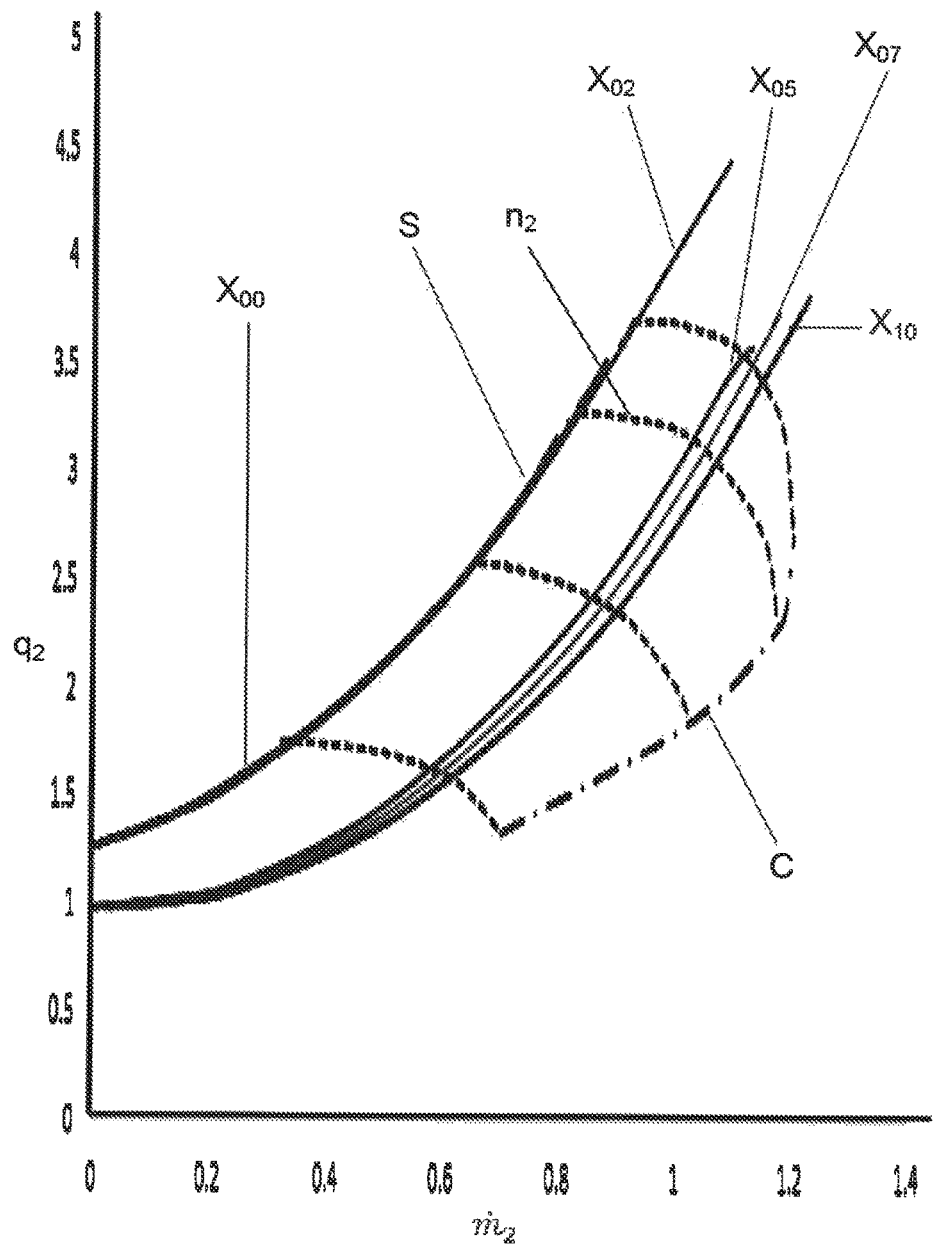
Figure 3:
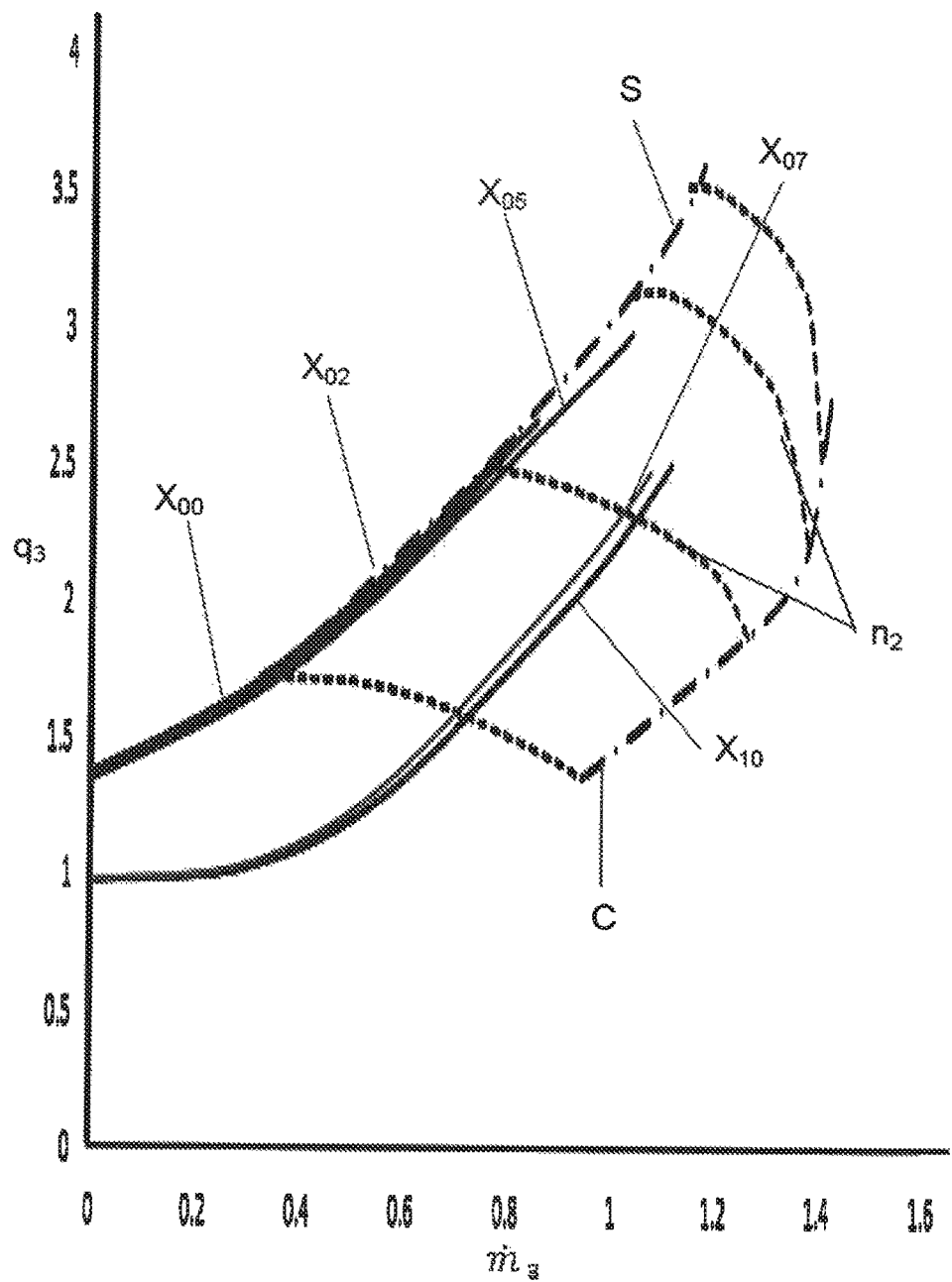
Figure 4:
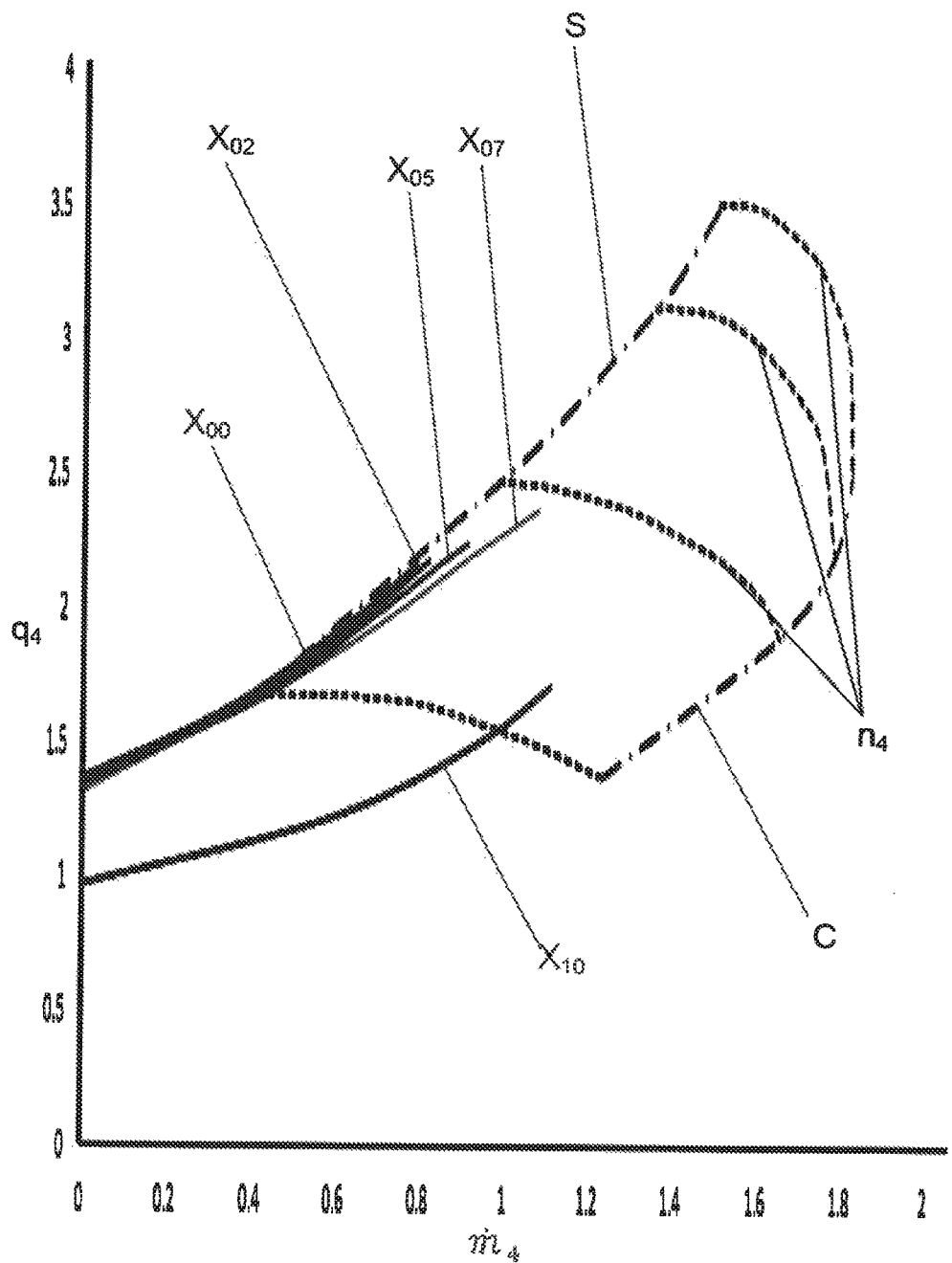
Figure 5:
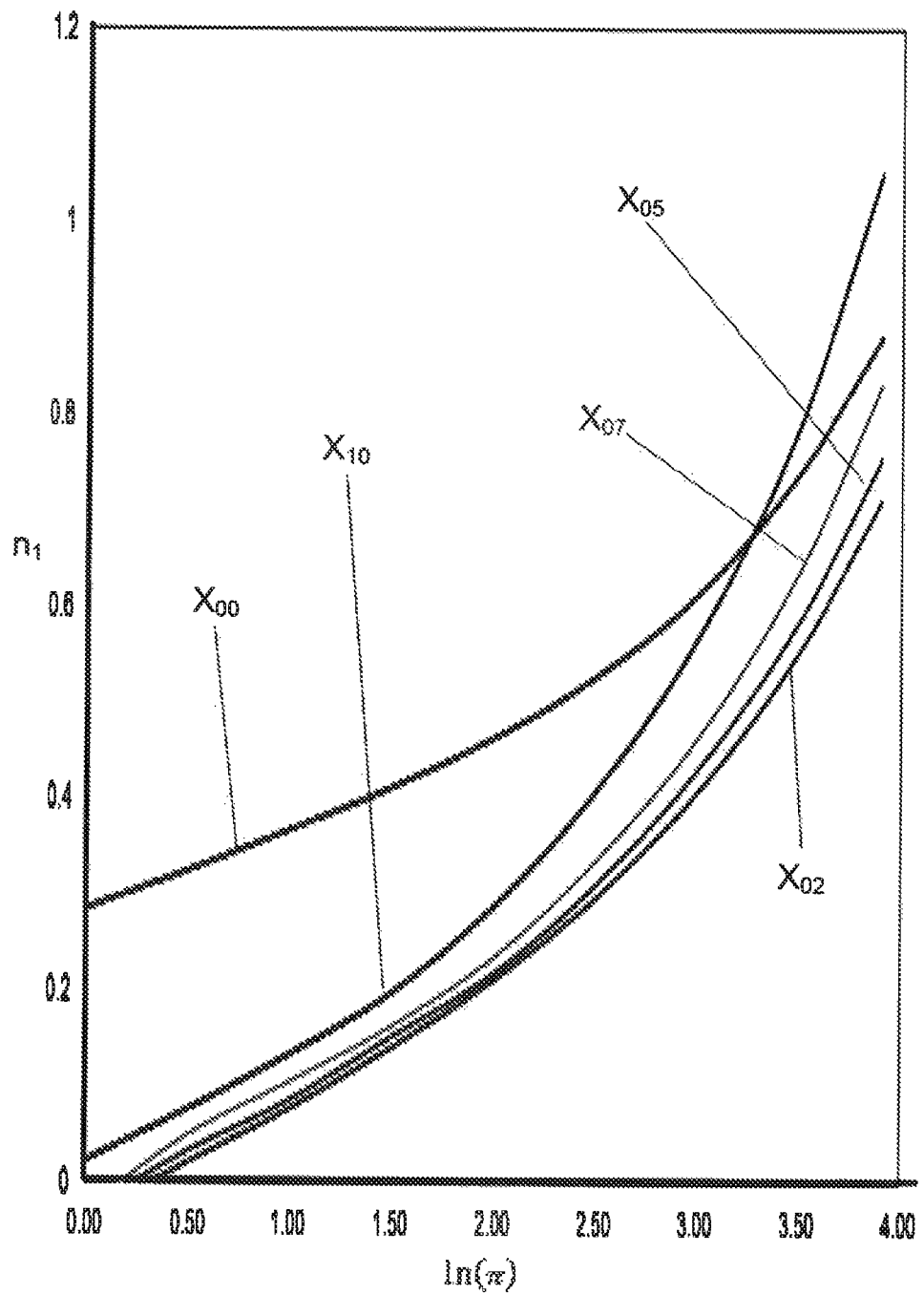
Figure 6:
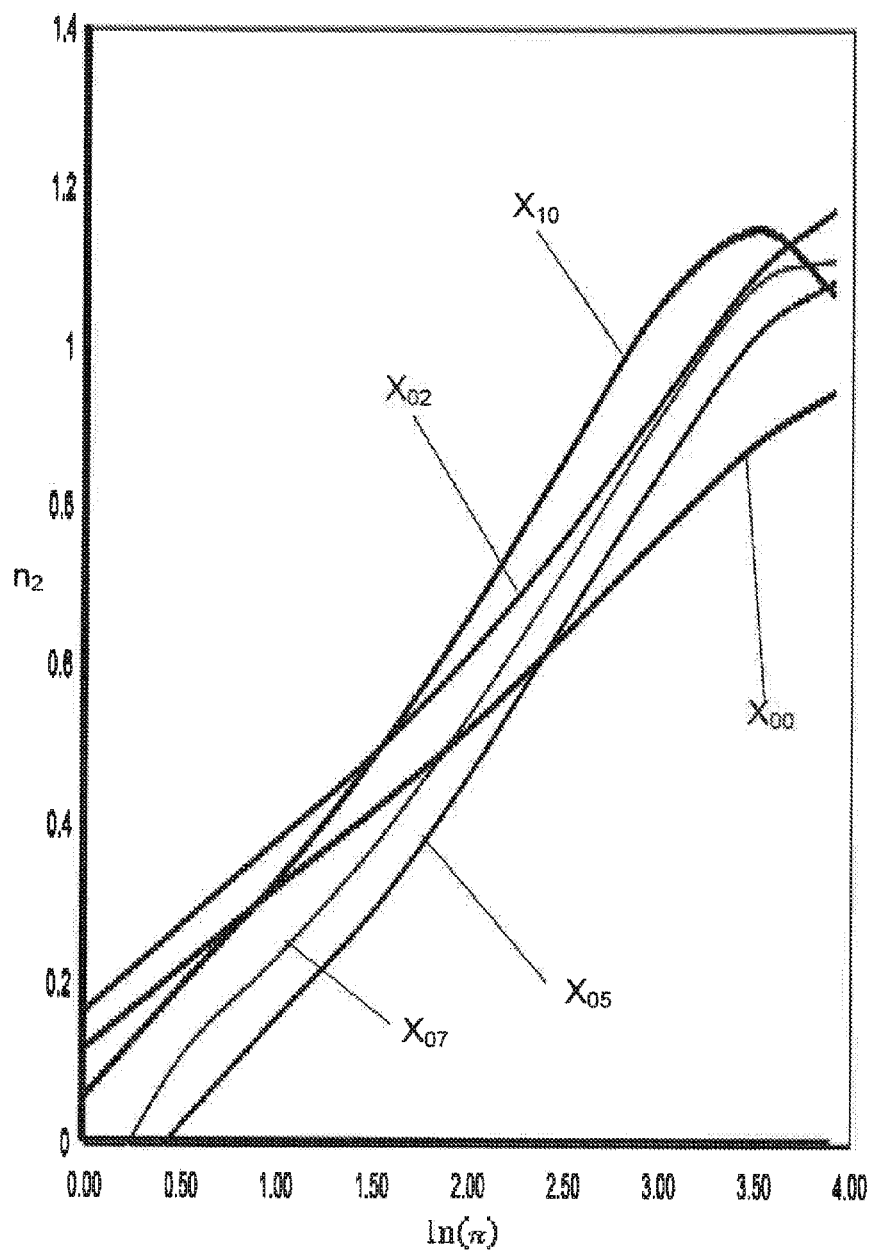
Figure 7:
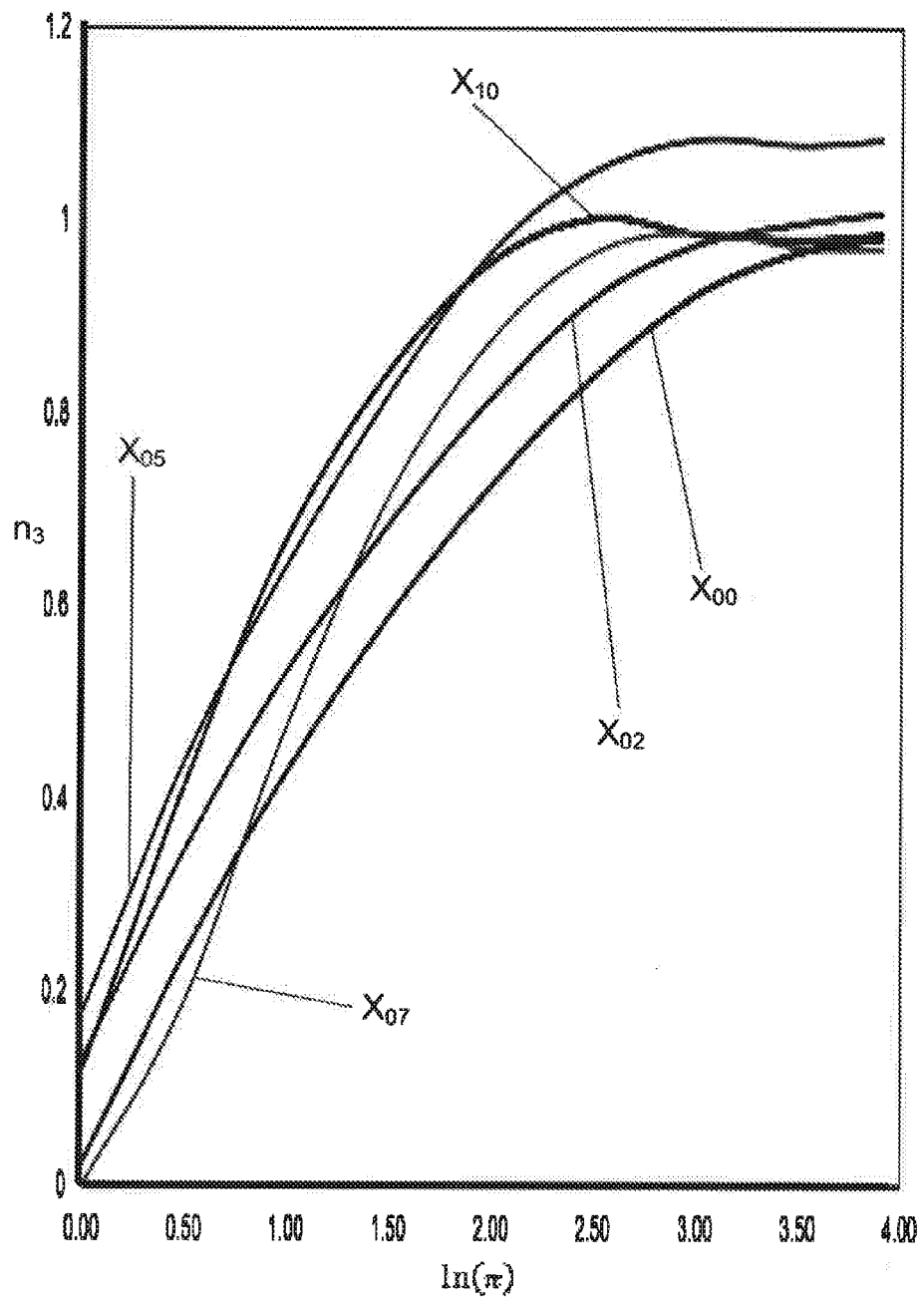
Figure 8:
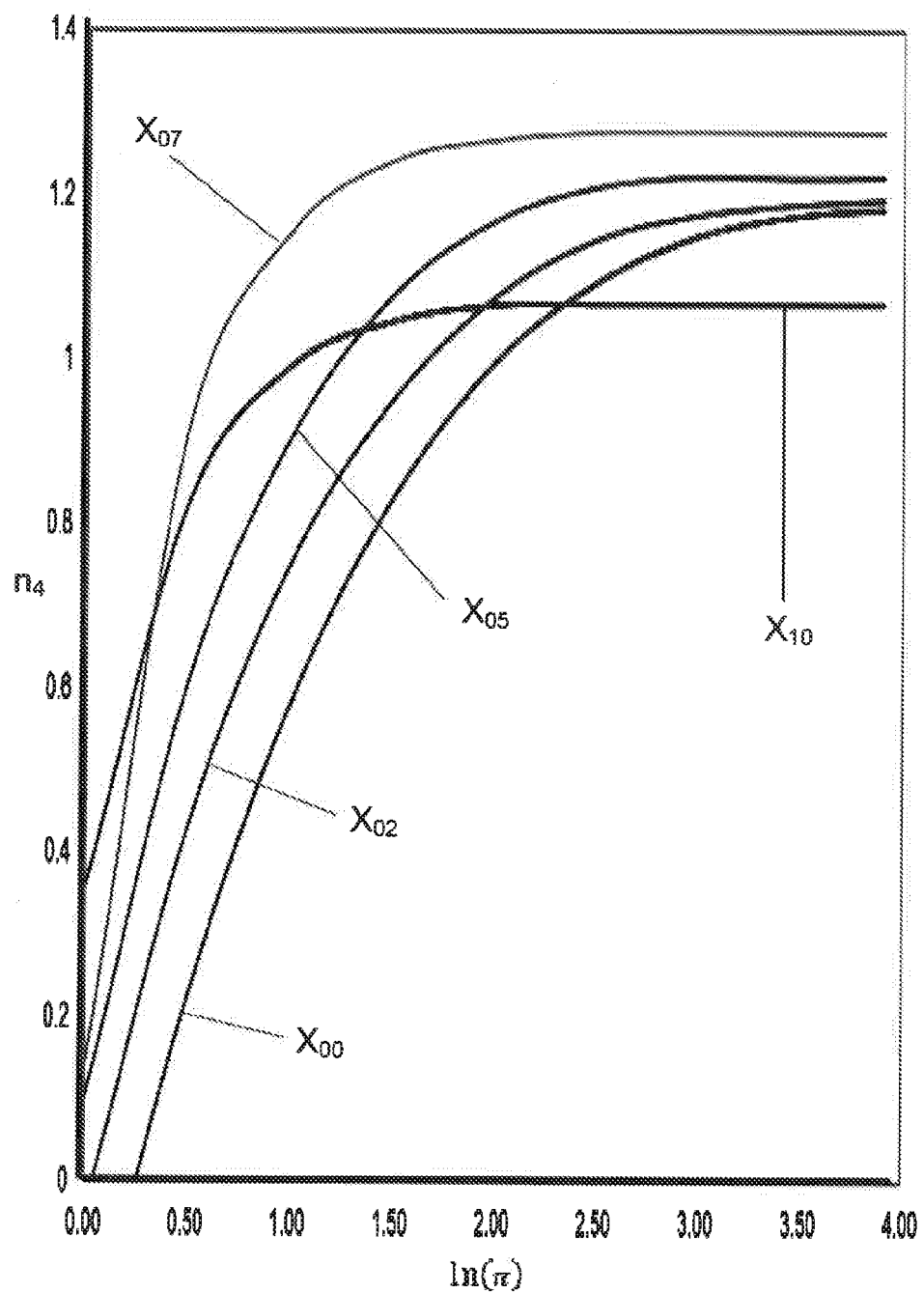
Figure 9:
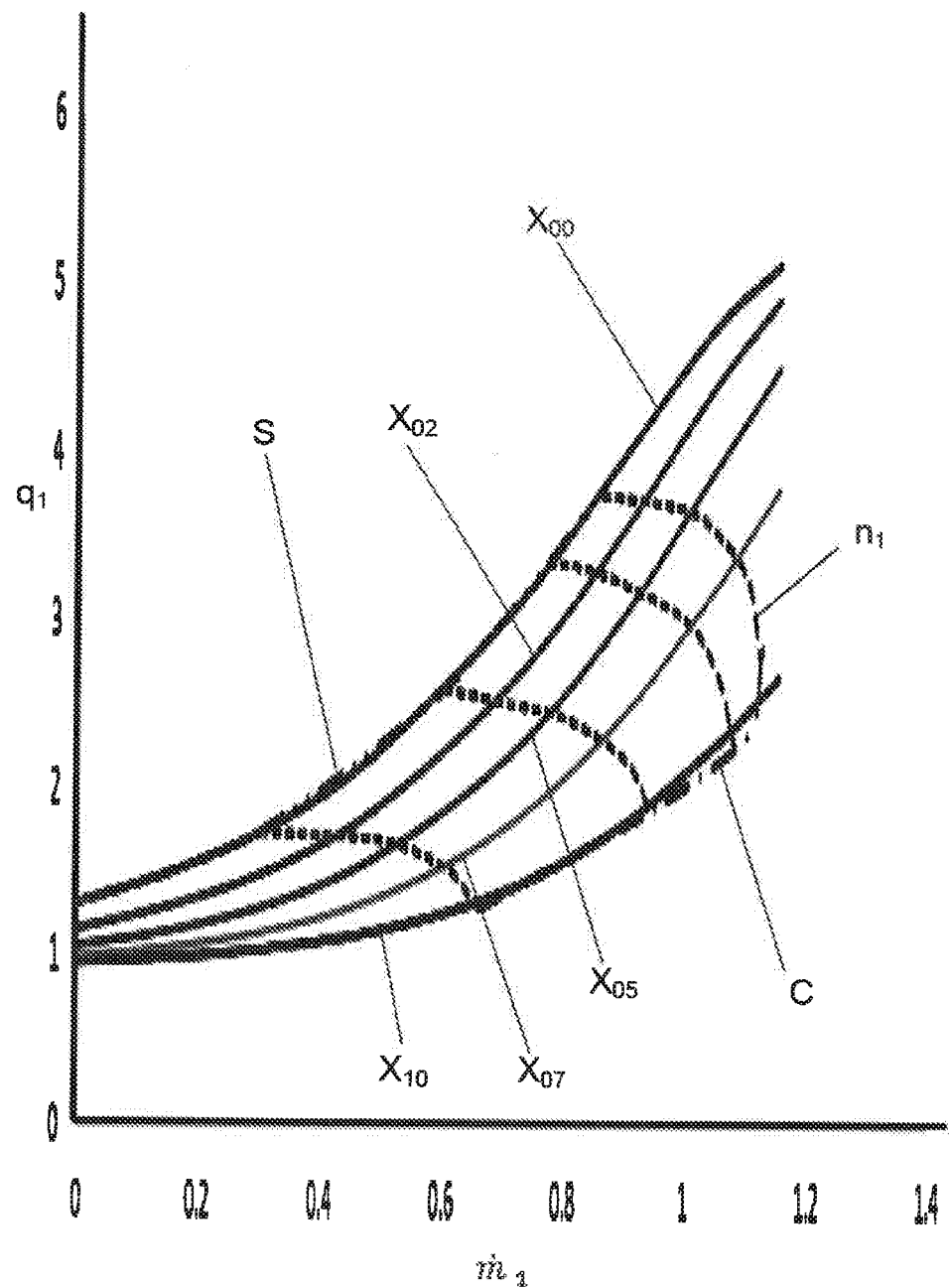
Figure 10:
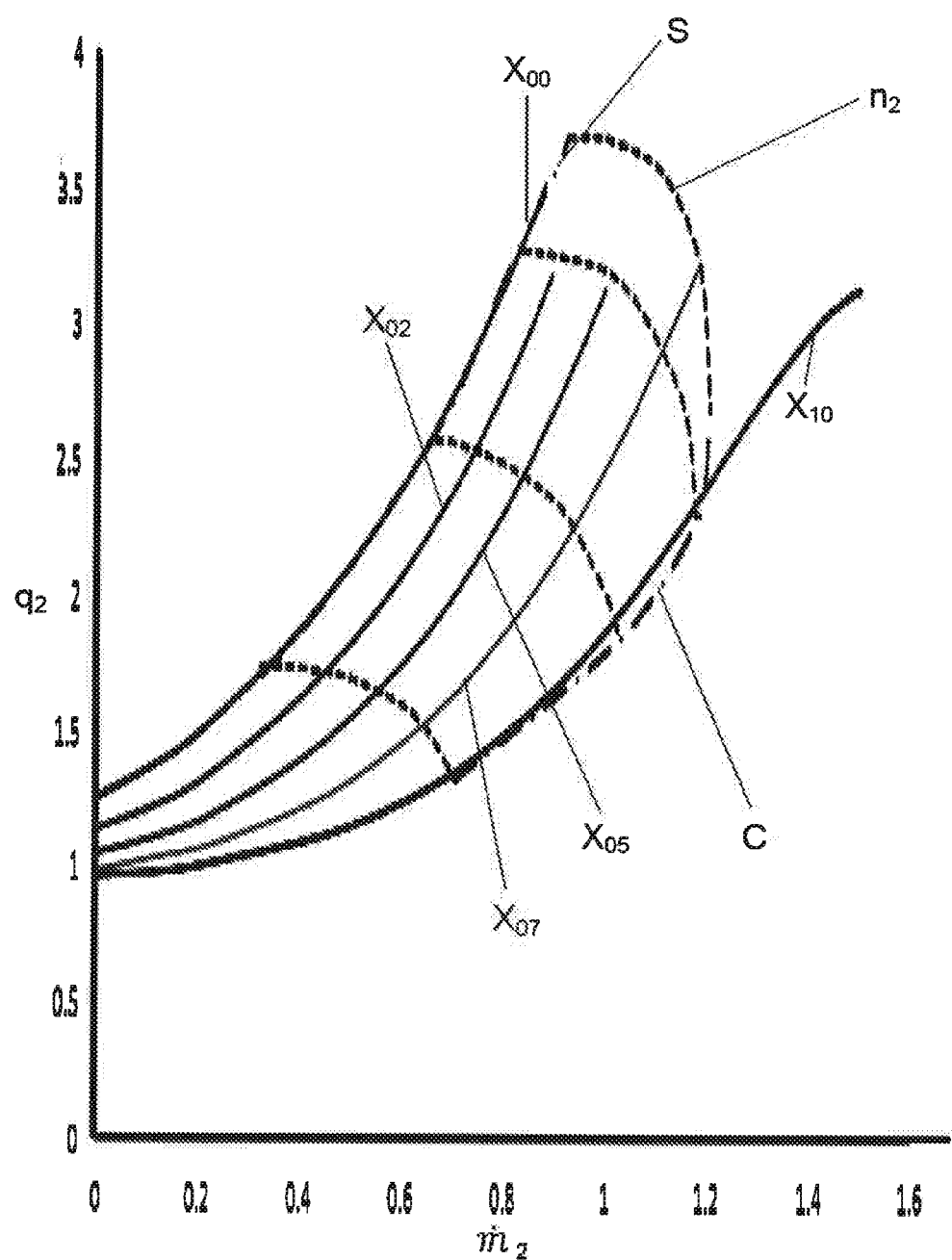
Figure 11:
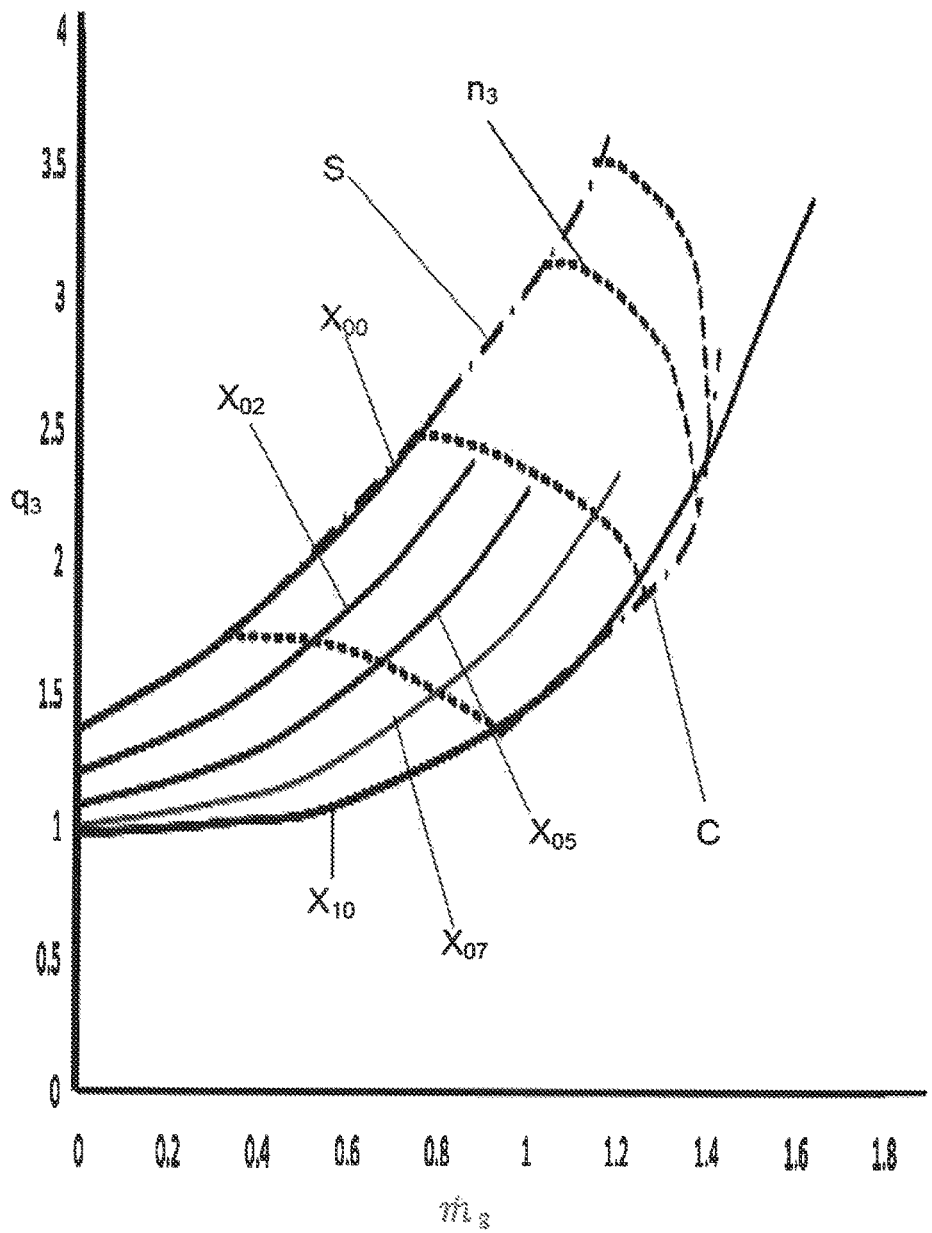
Figure 12:
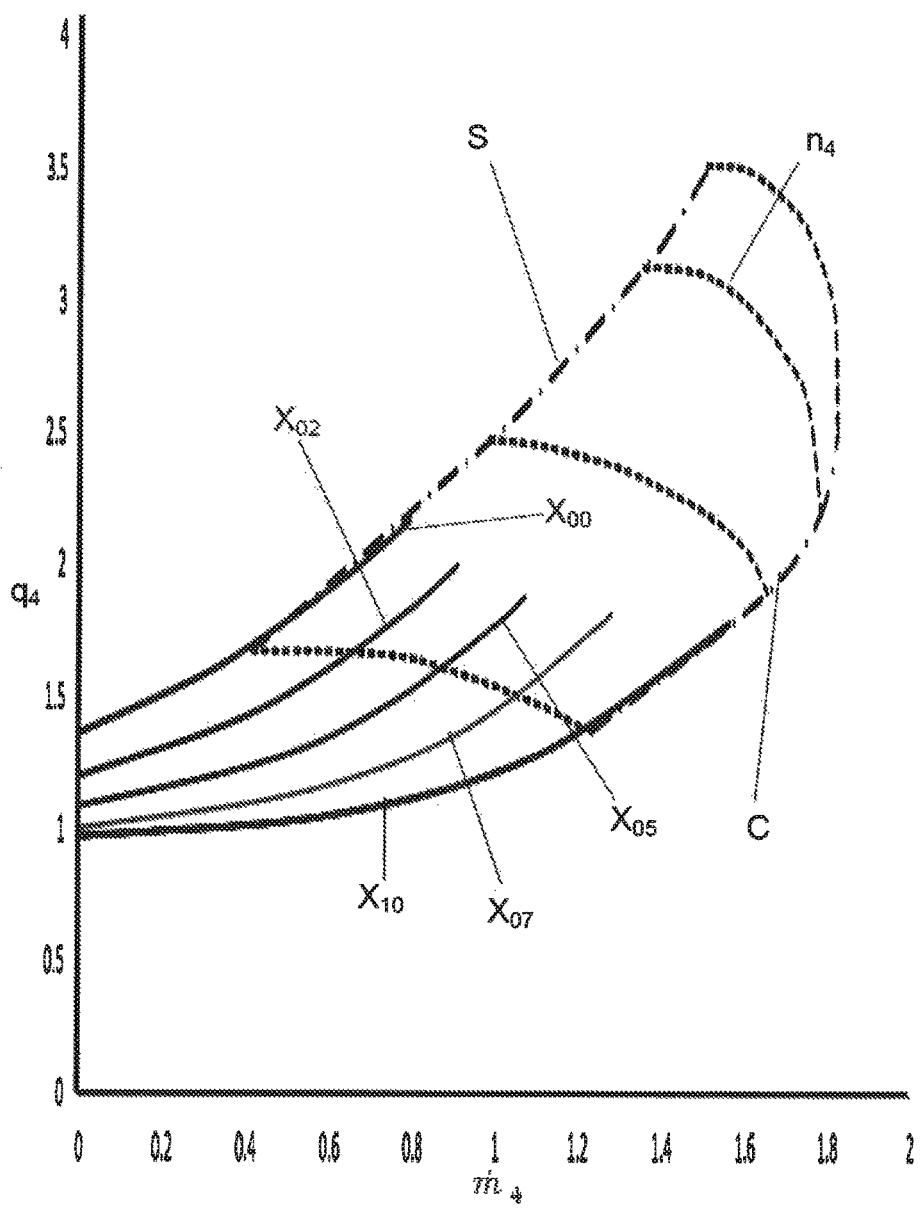
Figure 13:
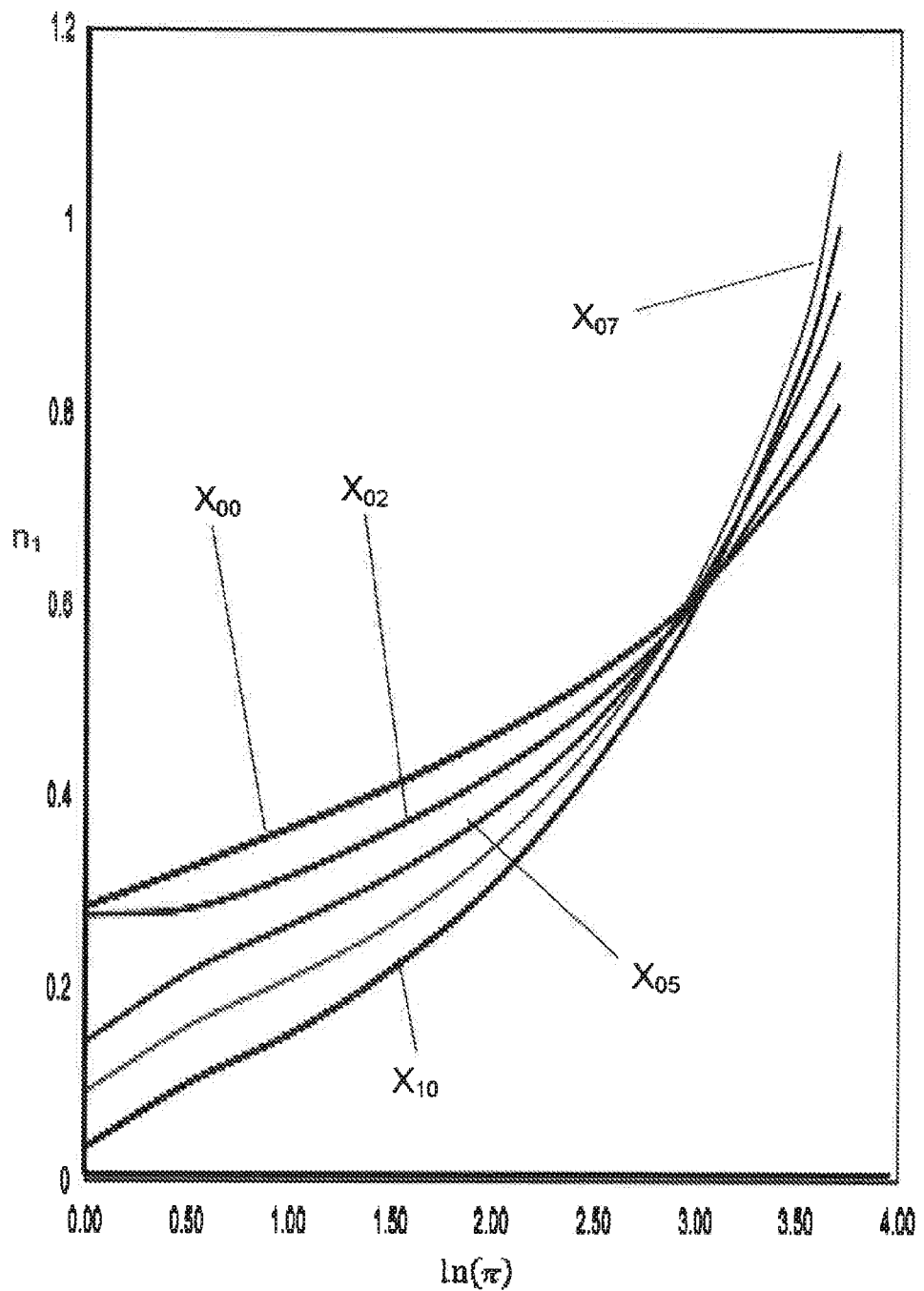
Figure 14:
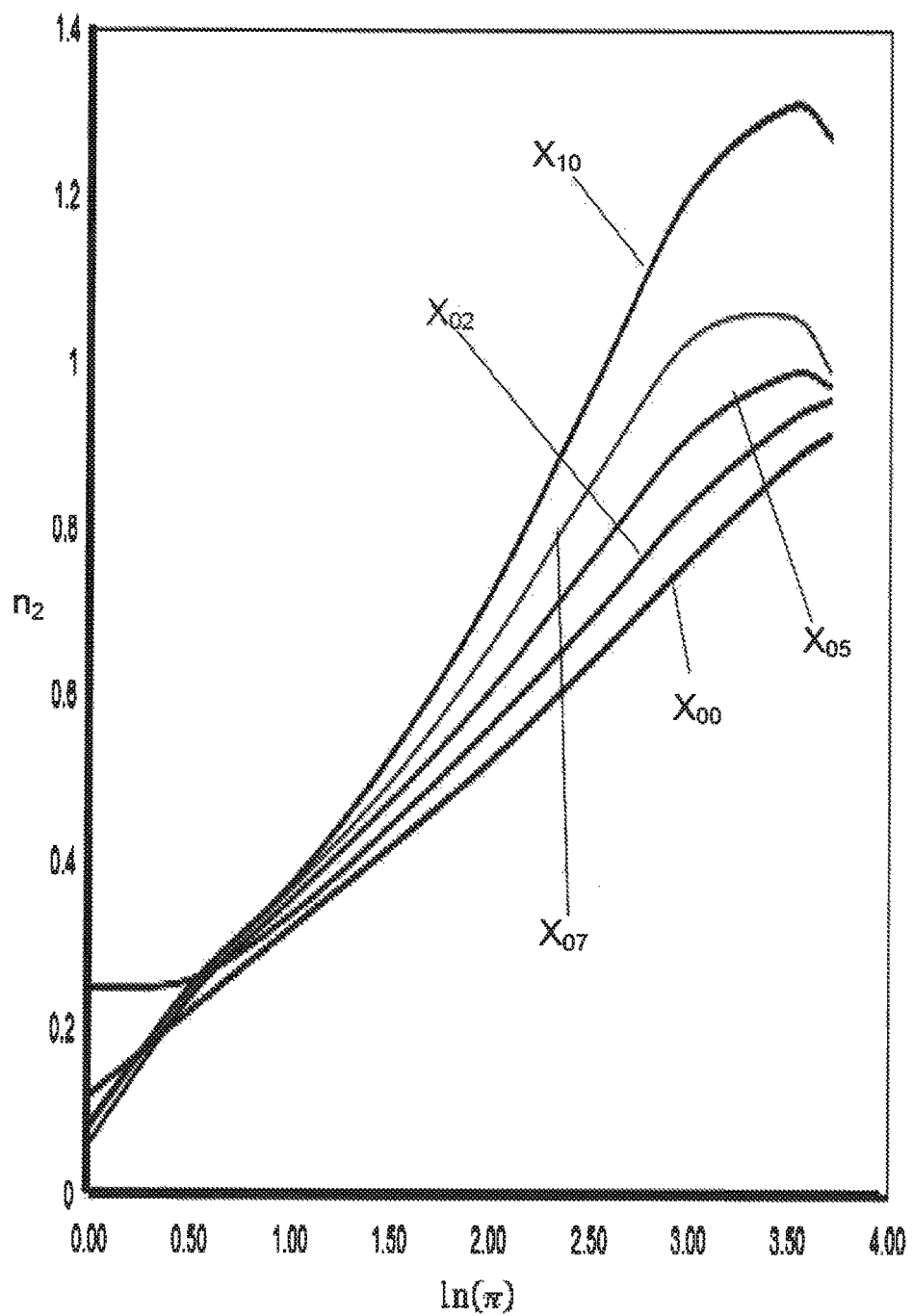
Figure 15:
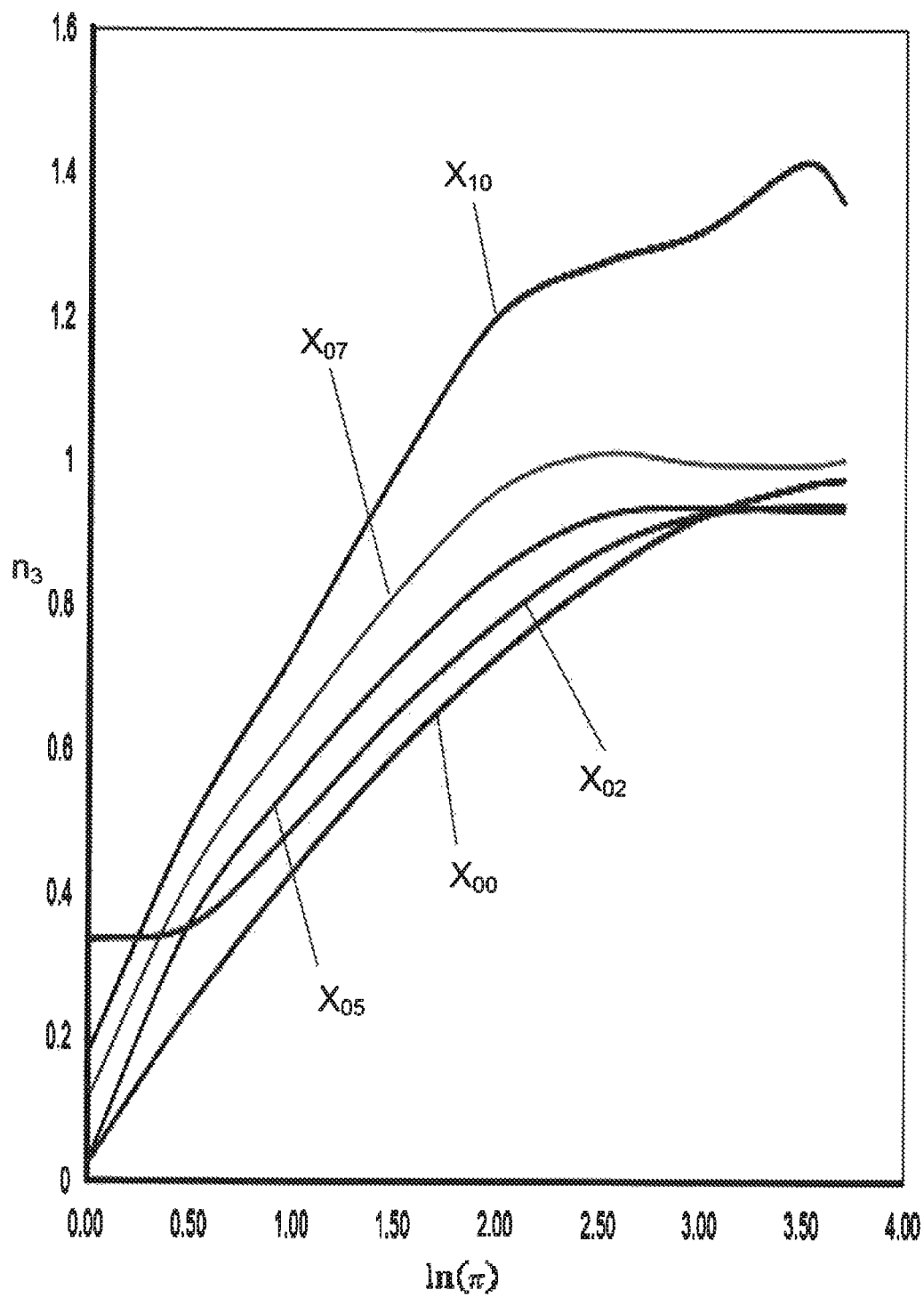
Figure 16:
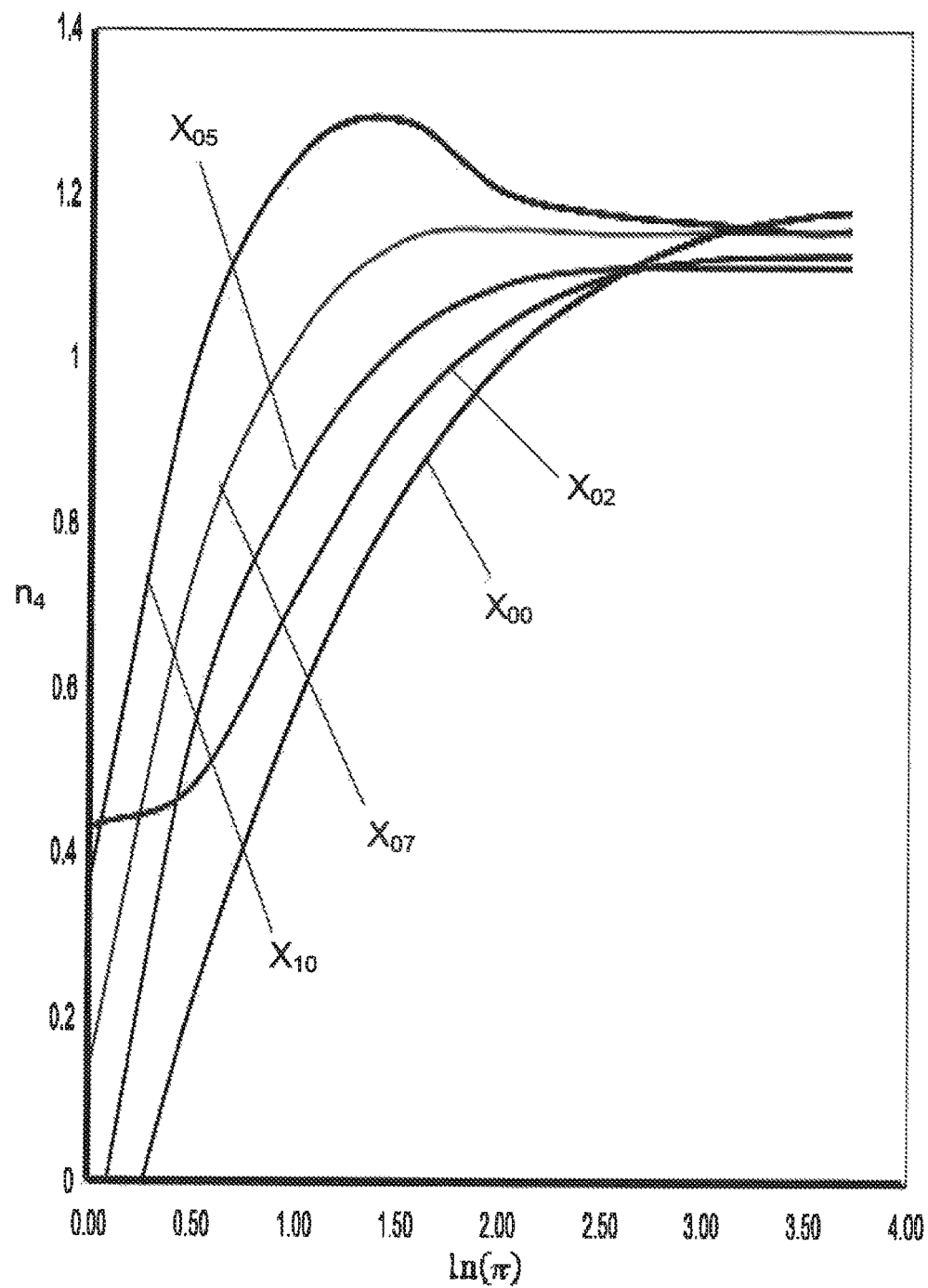
Figure 17:
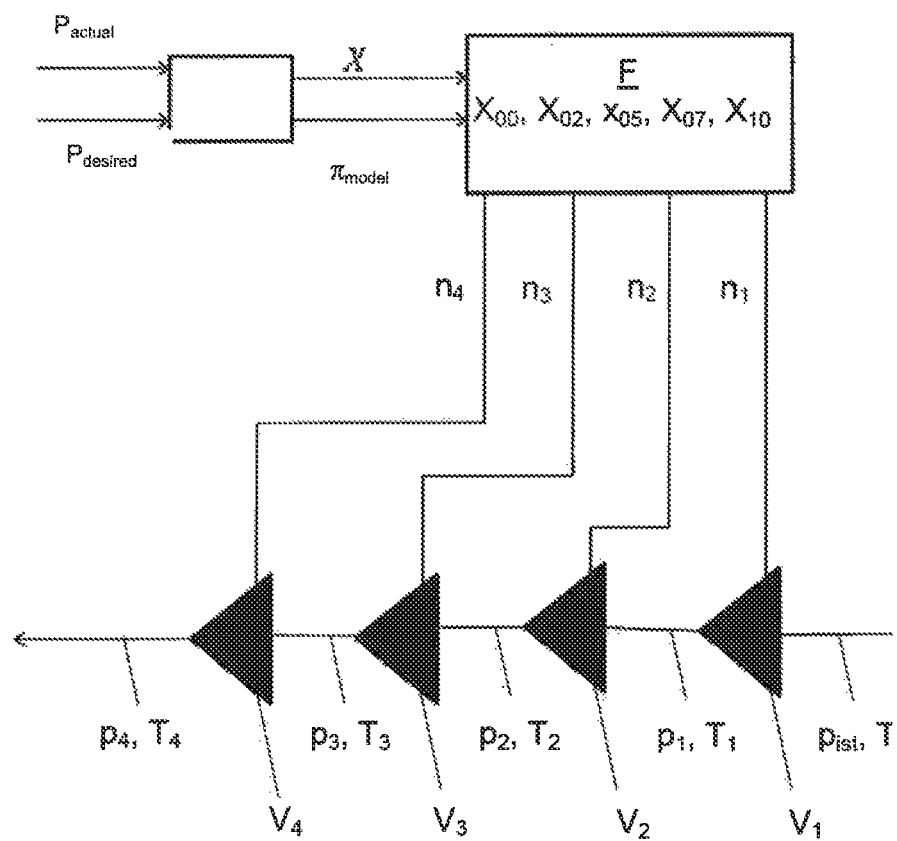
Figure 18:
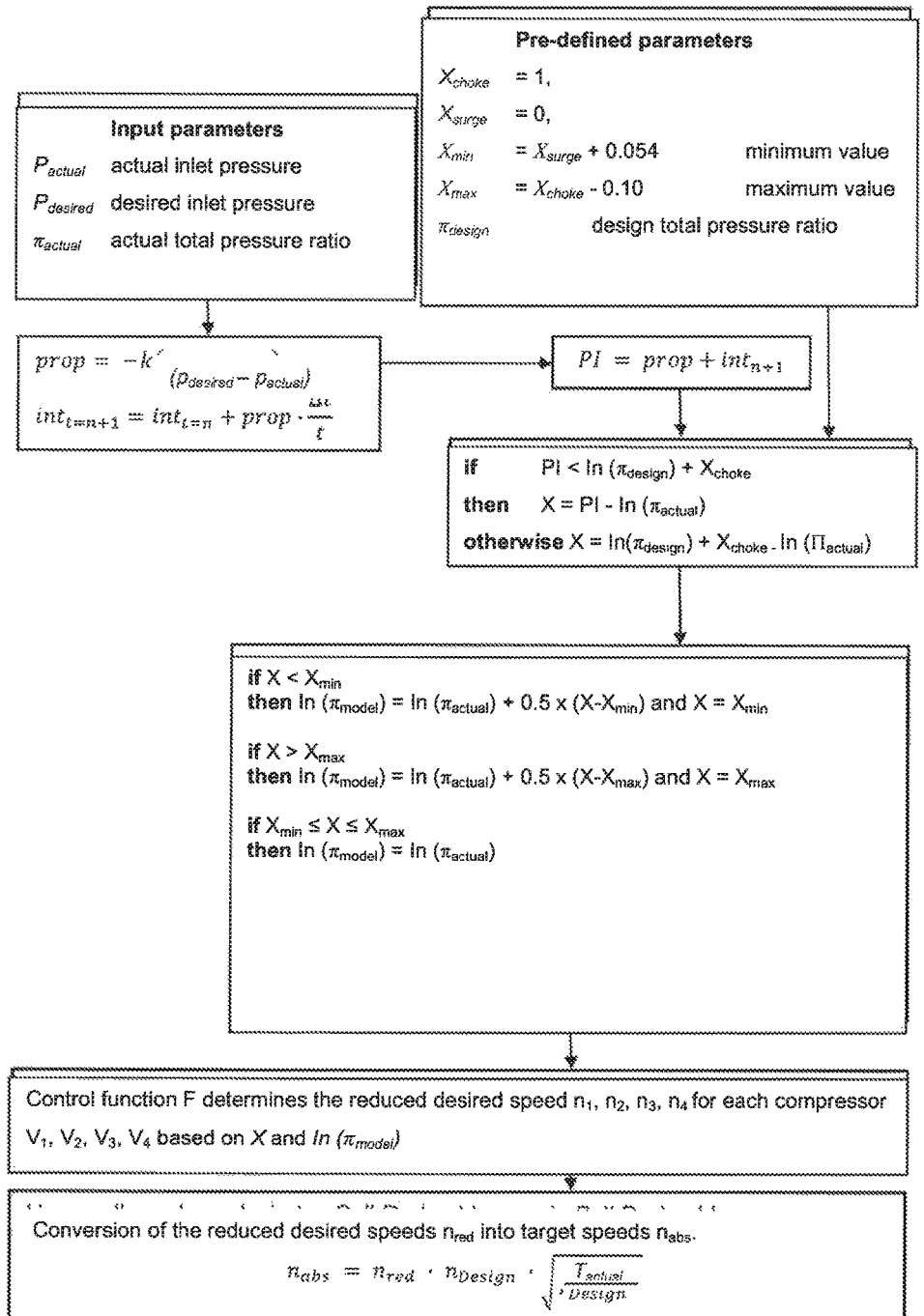

FIG. 2: Performance map with capacity lines of a second compressor, which is arranged downstream of the first compressor;

FIG. 3: Performance map with capacity lines of a third compressor, which is arranged downstream of the second compressor;

FIG. 4: Performance map with capacity lines of a fourth compressor, which is arranged downstream of the third compressor;

FIG. 5: Control field with the capacity lines of FIG. 1 for the first compressor;

FIG. 6: Control field with the capacity lines of FIG. 2 for the second compressor;

FIG. 7: Control field with the capacity lines of FIG. 3 for the third compressor;

FIG. 8: Control field with the capacity lines of FIG. 4 for the fourth compressor;

FIG. 9: Performance map with evenly distributed capacity lines of the first compressor of the compressors connected in series;

FIG. 10: Performance map with evenly distributed capacity lines of the second compressor;

FIG. 11: Performance map with evenly distributed capacity lines of the third compressor;

FIG. 12: Performance map with evenly distributed capacity lines of the fourth compressor;

FIG. 13: Control field with the capacity lines of FIG. 9 for the first compressor;

FIG. 14: Control field with the capacity lines of FIG. 10 for the second compressor;

FIG. 15: Control field with the capacity lines of FIG. 11 for the third compressor;

FIG. 16: Control field with the capacity lines of FIG. 12 for the fourth compressor;

FIG. 17: Plugging chart for carrying out the method according to the invention;

FIG. 18: Flow chart for the determination of the capacity factor and of the model total pressure ratio.

Figure 19:
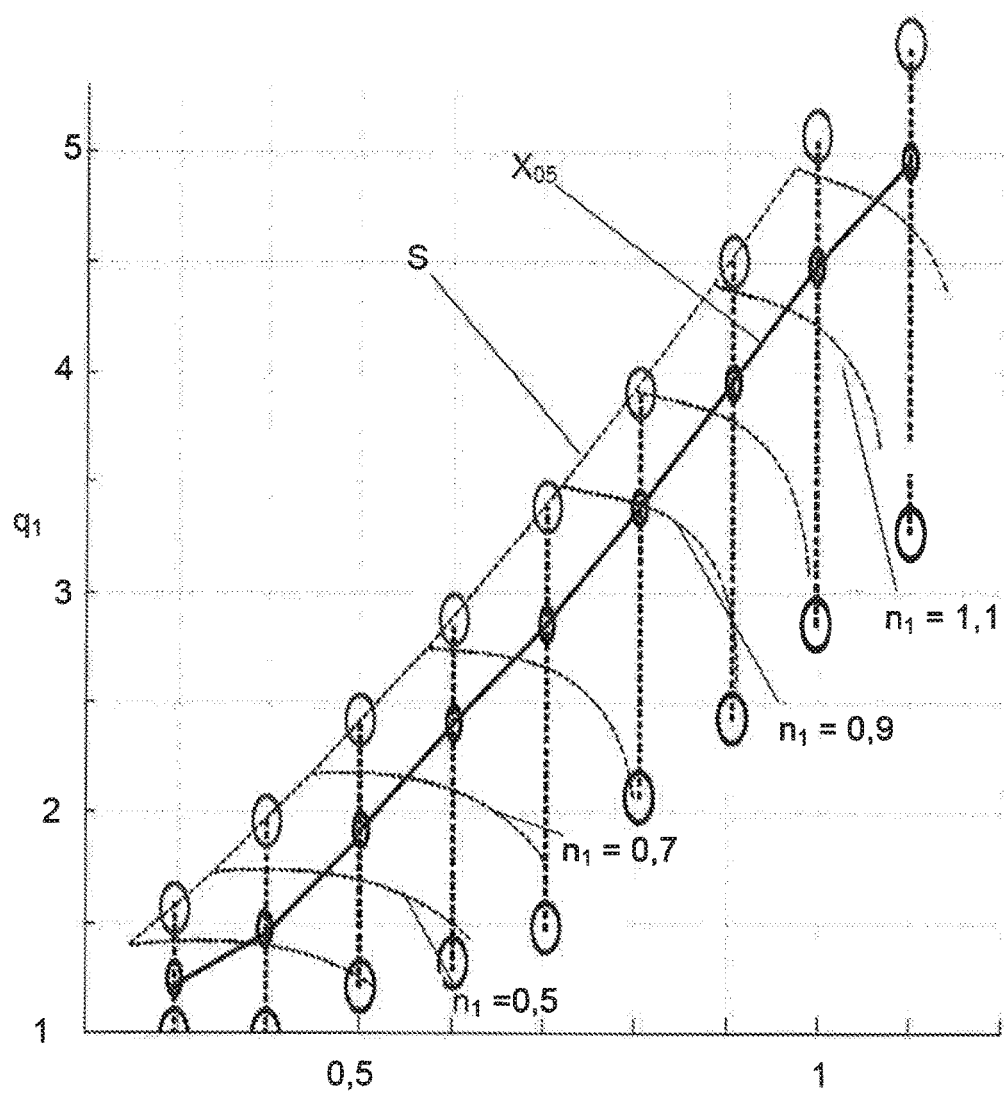

FIG. 19: Establishing a capacity line in the performance map of compressor $V_1$ FIGS. 1 to 4 show performance maps of four compressors $V_1$, $V_2$, $V_3$, $V_4$ connected in series for the compression of cryogenic helium in the area around 4K. The method according to the invention can also be used for the control of more or less than four compressors, depending on the total pressure ratio that is to be generated. Below a series arrangement of four compressors $V_1$, $V_2$, $V_3$, $V_4$ is being discussed as an example.

The performance map of a compressor represents operating states of the compressor, which operating states can be described by a reduced mass flow and an individual pressure ratio assigned to said reduced mass flow, wherein each operating state is assigned a desired speed in the performance map, which desired speed is required to achieve the operating state.

Such a performance map can be created for each compressor or is available for each compressor. A performance map can be created by measuring a plurality of different operating states and thereby characterizing the performance map, or also by a suitable software, which can display the compressor virtually.

In the so-called equilibrium operation, i.e. when the system is running in the planned state, the helium, e.g., is compressed from approximately 15 mbar to 600 mbar. That is, around the design point (operating state for which the compressor series or the compressor system is designed) the compressor system has a total pressure ratio of approximately 40 (600 mbar/15 mbar).

In each performance map of the four FIGS. 1-4, five capacity lines $X_{00}$, $X_{02}$, $X_{05}$, $X_{07}$, $X_{10}$ are drawn in that comprise the capacity factor X=0 ($X_{00}$), 0.25 ($X_{02}$), 0.5 ($X_{05}$), 0.75 ($X_{07}$), and 1 ($X_{10}$). The distribution of these lines $X_{00}$, $X_{02}$, $X_{05}$, $X_{07}$, $X_{10}$ is different for each compressor $V_1$, $V_2$, $V_3$, $V_4$ of the series. The specific distribution of the capacity lines $X_{00}$, $X_{02}$, $X_{059}$ $X_{07}$, $X_{10}$ in the respective performance map of the compressor ensures that an increase of the capacity factor X generally leads to an increase in the total surge performance, such that a stable system operation is guaranteed. The transverse dotted lines represent states that show the same reduced speeds $n_1$, $n_2$, $n_3$, $n_4$ of the respective compressor $V_1$, $V_2$, $V_3$, $V_4$.

During the operation of a system according to the method according to the invention, the compressors $V_1$, $V_2$, $V_3$, $V_4$ are run on the same capacity lines $X_{00}$, $X_{02}$, $X_{05}$, $X_{07}$ $X_{10}$ in each of the performance maps or control fields assigned to the respective compressor. I.e. that all compressors are run with the same capacity factor X.

It further applies that the discharge state, in particular the discharge pressure $p_1$ and the discharge temperature $T_1$ of the first compressor $V_1$ represent the inlet state of the second compressor $V_2$. The discharge state of the second compressor $V_2$ represents the inlet state of the third compressor $V_3$ and the discharge state of the third compressor $V_3$ in turn represents the inlet state of the fourth compressor $V_4$.

The product of the individual pressure ratios $q_1$, $q_2$, $q_3$, $q_4$ forms the actual total pressure ratio $\pi_{actual}$. By varying the capacity factor X, the distribution of the actual total pressure ratio $\pi_{actual}$ across the compressor series changes. In other words, the different capacity factors X influence the distribution of the individual pressure ratios $q_1$, $q_2$, $q_3$, $q_4$ via the respective compressors $V_1$, $V_2$, $V_3$, $V_4$, which are composed differently, according to each capacity factor X, whereby the common mass flow changes throughout all compressors $V_1$, $V_2$, $V_3$, $V_4$ of the series.

FIG. 1 shows the performance map of the first compressor $V_1$ of the series arrangement of the four compressors $V_1$, $V_2$, $V_3$, $V_4$ with the five capacity lines $X_{00}$, $X_{02}$, $X_{05}$, $X_{07}$, $X_{10}$. The capacity line $X_{00}$ is located on the surge characteristic S.

In order to guarantee stable operation of the compressor $V_1$ and in order for the compressor $V_1$ not to be run into surge state S, the capacity factor X, which is passed to the control function F, is limited to a minimum value $X_{min}$ of 0.05, if necessary. However, the capacity line $X_{10}$ is not located on the choke characteristic C of compressor $V_1$.

FIG. 2 shows the performance map of the second compressor $V_2$ of compressors $V_1$, $V_2$, $V_3$, $V_4$ arranged in series. Again, the capacity line $X_{00}$ is located on the surge characteristic S and the capacity lines $X_{05}$, $X_{07}$ and $X_{10}$ run similarly as in the performance map of compressor $V_1$. Only the capacity line $X_{02}$ runs further to the left here, close to capacity line $X_{00}$.

FIG. 3 shows the performance map of the third compressor $V_3$ of compressors $V_1$, $V_2$, $V_3$, $V_4$ arranged in series. The capacity line $X_{05}$ runs in the left area of the performance map here.

FIG. 4 shows the performance map of the fourth compressor $V_4$ of compressors $V_1$, $V_2$, $V_3$, $V_4$ arranged in series of the compressor system. Here, only the capacity line $X_{10}$ is still located in the right area of the performance map. The capacity lines $X_{00}$, $X_{02}$, $X_{05}$, $X_{07}$ are concentrated around the surge characteristic S. The reduced desired speeds $n_1$, $n_2$, $n_3$, $n_4$ for these capacity factors are calculated comparatively close to the so-called surge speed, that is, the reduced speed $n_4$, at which compressor $V_4$ moves into the surge state. To ensure stable operation of compressor $V_4$, said reduced desired speeds $n_4$ are limited to a range between 90-95% of the surge speed.

The described distribution of capacity lines $X_{00}$, $X_{02}$, $X_{05}$, $X_{07}$, $X_{10}$ in the performance map or control field for each compressor $V_1$, $V_2$, $V_3$, $V_4$ effects that in case of an actual total pressure ratio $\pi_{actual}$ that is too low, only the last compressor $V_4$ downstream contributes to the generation of the actual total pressure ratio $\pi_{actual}$. All of the foregoing compressors $V_1$, $V_2$, $V_3$ rotate just fast enough as not to create a flow resistance.

FIGS. 5 to 8 show control fields of compressors $V_1$, $V_2$, $V_3$, $V_4$. In the control field, the reduced speed $n_1$, $n_2$, $n_3$, $n_4$ is applied as a function of the natural logarithm of the total pressure ratio $\pi$. Furthermore, the capacity lines $X_{00}$, $X_{02}$, $X_{05}$, $X_{07}$, $X_{10}$ are recorded in the control field, the run of which lines and their distribution are in particular predefined by the run and the distribution of the capacity lines $X_{00}$, $X_{02}$, $X_{05}$, $X_{07}$, $X_{10}$ in the performance maps of compressors $V_1$, $V_2$, $V_3$, $V_4$.

For the transformation of the capacity lines $X_{00}$, $X_{02}$, $X_{05}$, $X_{07}$, $X_{10}$ from the performance map into the control field, a plurality of working points on the capacity lines $X_{00}$, $X_{02}$, $X_{05}$, $X_{07}$, $X_{10}$ of the compressor $V_1$ are arithmetically followed via the capacity lines $X_{00}$, $X_{02}$, $X_{05}$, $X_{07}$, $X_{10}$ of all subsequent compressors ($V_2$, $V_3$ and $V_4$) to the system output. This calculation is always based on the assumption that the state of the fluid at the entry of each additional compressor corresponds to the discharge state of the preceding compressor. For each working point the total pressure ratio 7 and the associated reduced speeds $n_1$, $n_2$, $n_3$, $n_4$ are determined.

Based on these control fields the reduced (desired) speeds $n_2$, $n_3$, $n_4$ for the respective compressor can be determined for each given value pair consisting of the capacity factor X and the total pressure ratio π. These reduced (desired) speeds $n_1$, $n_2$, $n_3$, $n_4$ are converted by means of measured temperatures into absolute desired speeds. Along the capacity lines $X_{00}$, $X_{02}$, $X_{05}$, $X_{07}$, $X_{10}$ the control function F can be explicitly read from the control field.

Controlling the Series in Different States:

The method according to the invention is suitable for controlling compressors $V_1$, $V_2$, $V_3$, $V_4$, in particular during the equilibrium operation, during which only low or slow inlet pressure fluctuations and discharge pressure fluctuations are to be expected. However, this method is also suitable for the so-called pump-up (the desired inlet pressure $p_{desired}$ is higher than the actual inlet pressure $p_{actual}$), or pump-down (the desired inlet pressure $p_{desired}$ is lower than the actual inlet pressure $p_{actual}$) from states that are comparatively far from equilibrium, which is an indicator of the stability of the method.

Example Equilibrium Operation:

In the equilibrium operation, only small fluctuations of the actual inlet pressure $p_{actual}$ occur, which is at about 20 mbar. At the output of the series, the output pressure $p_4$ fluctuates between, for example, 450 mbar and 500 mbar. The fluctuations are caused, for example, in the variable mass flow and the subsequent reaction of downstream volumetric machines after the compressor series. The actual total pressure ratio $p_{actual}$ lies consequently between 450 mbar/20 mbar=22.5 or 500 mbar/20 mbar=25. Thus, the natural logarithm of the actual total pressure ratio $\pi_{actual}$ is in the value range of 3.11-3.22. In this total operating state, the capacity factor X is about 0.5. For the fluctuating actual total pressure ratio $\pi_{actual}$ of 3.11-3.22, the respectively reduced desired speeds $n_1$, $n_2$, $n_3$, $n_4$ four the four compressors $V_1$, $V_2$, $V_3$, $V_4$ can be found in FIGS. 5 to 8.

Example Pump Down:

The actual inlet pressure $p_{actual}$ is bigger than the desired inlet pressure $p_{desired}$ (e.g. actual inlet pressure $p_{actual}$=100 mbar, desired inlet pressure $p_{desired}$=20 mbar). The actual discharge pressure $p_4$ fluctuates between 450 mbar and 500 mbar, i.e. the logarithm of the actual total pressure ratio $\pi_{actual}$ fluctuates between 1.5 and 1.6. Due to the high deviation of the actual inlet pressure $p_{actual}$ from the desired inlet pressure $p_{desired}$ the capacity factor X is continuously increased (e.g., from 0.5 to 1).

In a logarithmic actual total pressure ratio $\pi_{actual}$ of 1.5, an increase of the capacity factor from 0.5 to 1 effects the following:

The reduced desired speed $n_1$ for the first compressor $V_1$ is slightly increased (FIG. 5). The reduced desired speed $n_2$ for the second compressor $V_2$ is increased by more than the reduced desired speed of the first compressor $V_1$ (FIG. 6). The reduced desired speed $n_3$ for the third compressor $V_3$ is reduced for the capacity factors X between 0.5 and 0.75, and is increased again between 0.75 and 1 (FIG. 7). The reduced desired speed $n_4$ is increased for capacity factors X between 0.5 and 0.75 and again reduced between 0.75 and 1 (FIG. 8).

Through this control, the actual inlet pressure $p_{actual}$ adjusts to the desired inlet pressure $p_{desired}$, wherein the capacity factor X, depending on the actual total pressure ratio $\pi_{actual}$ is adapted, and eventually, when reaching the desired inlet pressure $p_{desired}$, drops to approximately 0.5 again.

In FIGS. 5 to 8 this control can be seen as follows: By increasing the capacity factor X, one moves at first generally vertically in the control field, i.e. the reduced desired speeds $n_1$, $n_2$, $n_3$, $n_4$ are (generally) increased for each compressor $V_1$, V?, $V_3$, $V_4$. This causes a change of the total pressure ratio $\pi_{actual}$ because an increased reduced mass flow $\dot{m}_1$, $\dot{m}_2$, $\dot{m}_3$, $\dot{m}_4$ results as a consequence of the increased speeds $n_1$, $n_2$, $n_3$, $n_4$. Thereby, the actual total pressure ratio $\pi_{actual}$ increases, since the actual inlet pressure $p_{actual}$ decreases. An increasing actual total pressure ratio $\pi_{actual}$ is now causing a substantially horizontal movement in the control field, such that the capacity factor X is generally down-regulated again. If the actual inlet pressure $p_{actual}$ now corresponds to the desired inlet pressure $p_{desired}$, the capacity factor X is approximately 0.5. At this value of the capacity factor X and the logarithm of the design total pressure ratio $\pi_{design}$ (of, for example, 3.5), the series of compressors is running with the highest efficiency.

Example Pump Up:

The actual inlet pressure $p_{actual}$ is smaller than the desired inlet pressure $p_{desired}$ (e.g. actual inlet pressure $p_{actual}$=20 mbar, desired inlet pressure $p_{desired}$=100 mbar). The actual discharge pressure $p_4$ fluctuates between 450 mbar and 500 mbar, i.e. the logarithm of the actual total pressure ratio $\pi_{actual}$ fluctuates between 3.11 and 3.22. Due to the deviation of the actual inlet pressure to the desired inlet pressure, the capacity factor X is reduced (e.g. from 0.5 to 0).

If the capacity factor X at a logarithmic actual total pressure ratio $\pi_{actual}$ of 3.11 decreases from 0.5 to 0, the following occurs:

The reduced desired speed $n_1$ of the first compressor $V_1$ is increased (FIG. 5). The reduced desired speed $n_2$ for the second compressor $V_2$ is initially increased for the capacity factors X between 0.5 and 0.25 and then again reduced between 0.25 to 0 (FIG. 6). The reduced desired speed $n_3$ of the third compressor $V_3$ is reduced (FIG. 7). The reduced desired speed $n_4$ of the fourth compressor $V_4$ is reduced (FIG. 8).

In this way, the actual total pressure ratio $\pi_{actual}$ is reduced and therefore actual inlet pressure $p_{actual}$ strives towards the desired inlet pressure $p_{desired}$.

This type of regulation is especially advantageous for operating states or actual total pressure states $\pi_{actual}$ close to the design total pressure ratio $\pi_{design}$. During the control of states that deviate significantly from the design total pressure ratio $\pi_{design}$, the capacity factor X is run in saturation (i.e. 0 or 1, or 0.05 or 0.9), yet the actual total pressure ratio $\pi_{actual}$ does not necessarily change, since, for example, two capacity lines $X_{00}$, $X_{02}$, $X_{05}$, $X_{07}$, $X_{10}$ overlap at these states. An increase or reduction of the capacity factor X does not result in a change of the reduced desired speed $n_1$, $n_2$, $n_3$, $n_4$ there. In this case, the method according to the invention controls as follows:

Example Pump Down:

The actual discharge pressure $p_4$ is, for example, at 450 mbar, and the actual inlet pressure $p_{actual}$ is at 350 mbar. The logarithm of the actual total pressure ratio $\pi_{actual}$ is therefore approximately at 0.25. The desired inlet pressure $p_{desired}$ is 20 mbar. The capacity factor X is thus increased due to the difference between the actual and the desired inlet pressure.

In FIG. 8, which shows the control field of the fourth compressor $V_4$, it can be seen that an increase of the capacity factor X from 0.75 to 1 (or to 0.9, due to the limitation to the maximum value $X_{max}$) does not necessarily result in an increase of the reduced desired speed $n_4$. The actual total pressure ratio $\pi_{actual}$ would not change any further then. In this case, the actual total pressure ratio $\pi_{actual}$ is replaced or adapted by a model total pressure ratio $\pi_{model}$ (cf. above).

However, it could also occur that the increase leads to higher desired speeds in two compressors of the series, and to a reduction of the desired speed in the other two compressors. If the total reaction of the chain can reduce the actual inlet pressure $p_{actual}$, the system can still continue to work with the actual total pressure ratio $\pi_{actual}$, otherwise the actual total pressure ratio $\pi_{actual}$ is replaced by the model total pressure ratio $\pi_{model}$, as described.

The model total pressure ratio $\pi_{model}$ is slightly larger than the actual total pressure ratio $\pi_{actual}$. Thus, in the control field of the fourth compressor $V_4$, movement occurs horizontally along the capacity line $X_{10}$ of 1 (or 0.9). Consequently, one moves out of the overlapping region of the capacity lines $X_{07}$ and $X_{10}$, such that the control based on the model total pressure ratio $\pi_{model}$ and the capacity factor X continues to work effectively. Once the capacity factor X is no longer in saturation, i.e. when the proportional integral value PI is no longer above the maximum value $X_{max}$ of the capacity factor X, the model total pressure ratio $\pi_{model}$ equals the actual total pressure ratio $\pi_{actual}$.

Rational Arrangement of the Capacity Lines $X_{00}$, $X_{02}$, $X_{05}$, $X_{07}$, $X_{10}$ in the Performance Map of each Compressor $V_1$, $V_2$, $V_3$, $V_4$:

FIGS. 9 to 12 show an even distribution of the capacity lines $X_{00}$, $X_{02}$, $X_{05}$, $X_{07}$, $X_{10}$ in the performance map for each compressor $V_1$, $V_2$, $V_3$, $V_4$. This type of distribution involves several disadvantages, the elimination of which results, for example, in distributions such as shown in FIGS. 1 to 4.

Along the capacity line $X_{10}$, the second and the third compressor $V_2$, $V_3$ (FIGS. 10 and 11) display very high reduced mass flows $\dot{m}_2$, $\dot{m}_3$ on top of very high reduced speeds $n_2$, $n_3$ of the respective compressor. In this area, the efficiency of the two compressors $V_2$, $V_3$ drops significantly and the discharge temperature increases, thus increasing the risk, in particular at the third compressor $V_3$, of a too high speed (overspeed).

Furthermore, by increasing the capacity factor X (i.e., in particular, if the actual inlet pressure $p_{actual}$ significantly deviates from the desired inlet pressure $p_{desired}$), according to expectations, a higher reduced desired speed $n_2$, $n_3$ should be achieved. FIG. 13 shows, however, that during an even distribution of the capacity lines $X_{00}$, $X_{02}$, $X_{05}$, $X_{07}$, $X_{10}$ in the performance map, the reduced speeds $n_1$ in the performance map, for example, for the first compressor $V_1$ (FIG. 9), are reduced to a pressure ratio of approximately 3 for increasing capacity factors X, which would be an undesired control. The goal is, after all, an increase of the reduced speeds $n_1$, in order to reduce the actual inlet pressure $p_{actual}$.

Furthermore, the fourth compressor $V_4$ has temporarily very high reduced speeds $n_4$ at low actual total pressure ratios $\pi_{actual}$ (FIG. 16). This applies, in particular, to capacity line $X_{10}$. Very high reduced speeds $n_1$ point to very high speeds and high temperatures, which characterizes an inefficient operational state.

An uneven distribution of the capacity lines $X_{00}$, $X_{02}$, $X_{05}$, $X_{07}$, $X_{10}$ in the performance map, on the other side, effects the following favorable characteristics: FIG. 5 shows that the reduced speeds m from the first compressor $V_1$ increase along the capacity lines $X_{02}$, $X_{05}$, $X_{07}$ and $X_{10}$, in each case in the actual total pressure ratio $\pi_{actual}$. Thereby, the undisturbed operation of the most important compressor with the highest single pressure ratio is ensured during a pump down.

FIGS. 1 to 4 show that no compressor is driven into the choke state (i.e. to the choke characteristic C), thus guaranteeing a high efficiency.

FIGS. 5 to 8 show further, that each compressor $V_1$, $V_2$, $V_3$, $V_4$, at a certain actual total pressure ratio $\pi_{actual}$ (or the logarithm thereof) reaches a reduced desired speed $n_1$, $n_2$, $n_3$, $n_4$ of 1 and remains in this area. (At low pressure conditions $\pi_{actual}$ the fourth compressor $V_4$, at medium pressure conditions, the second and third compressors $V_2$, $V_3$, and at high pressure conditions $\pi_{actual}$, as can be found at the design point, the first compressor $V_1$). This behavior ensures an undisturbed pump down and reduces the risk of overspeeding.

High capacity factors X do not always lead to higher reduced speeds $n_1$, $n_2$, $n_3$, $n_4$, neither at evenly distributed capacity lines $X_{00}$, $X_{02}$, $X_{05}$, $X_{07}$, $X_{10}$, nor at unevenly distributed capacity lines $X_{00}$, $X_{02}$, $X_{05}$, $X_{07}$, $X_{10}$. However, in the case of unevenly distributed capacity lines $X_{00}$, $X_{02}$, $X_{05}$, $X_{07}$, $X_{10}$, there is the possibility to achieve a consistent increase of the reduced desired speeds $n_1$, $n_2$, $n_3$, $n_4$ by increasing the total pressure ratio n to a model total pressure ratio $\pi_{model}$.

The criteria for the distribution of the capacity lines $X_{00}$, $X_{02}$, $X_{05}$, $X_{07}$, $X_{10}$ in the performance map of each compressor $V_1$, $V_2$, $V_3$, $V_4$ may be derived from the following principles. By defining/distributing the capacity lines $X_{00}$, $X_{02}$, $X_{05}$, $X_{07}$, $X_{10}$, the regulation function F for the reduced speeds $n_1$, $n_2$, $n_3$, $n_4$ is also determined.

The most critical compressor, usually the first compressor $V_1$ in the series, must display reduced speeds $n_1$ for increasing capacity factors X from X=0 to X=1, which reduced speeds should be as steady and continuously increasing as possible, as well as increasing reduced speeds $n_1$ for increasing total pressure ratios $\pi$. No compressor is to be operated on the choke or surge characteristic C, S. No compressor must be controlled to an overspeed, since otherwise machine safety is not guaranteed.

The compressors $V_1$, $V_2$, $V_3$, $V_4$ must reach their design points (economic operating states) successively and, upon reaching the design point, the reduced desired speed value $n_1$, $n_2$, $n_3$, should stay around 1 (at a tolerance of approximately 5%). I.e., during low total pressure ratios, the total pressure ratio should be generated by the fourth (last) compressor $V_4$ of the series, wherein, during an increasing total pressure ratio, when the fourth compressor is already running at the design point, the third compressor $V_3$, and in case of a further increase of the total pressure ratio, the second compressor $V_2$ is connected, and finally the first compressor $V_1$, such that in the end all compressors are operated on their respective design points.

At the design point, at which all the compressors $V_1$, $V_2$, $V_3$, $V_4$ run at approximately the reduced speed $n_1$, $n_2$, $n_3$, $n_4$ equal to 1, the compressors with the highest single pressure ratio $q_1$, $q_2$, $q_3$, $q_4$ must (if possible) display increasing reduced desired speeds $n_1$, $n_2$, $n_3$, $n_4$ for increasing capacity factors X, such that the control around the design point can be carried out quickly. At the design point, the first compressor $V_1$ usually shows the highest single pressure ratio $q_1$.

Furthermore, the capacity lines $X_{00}$, $X_{02}$, $X_{05}$, $X_{07}$, $X_{10}$ must in particular meet the following conditions in the performance map:

They must be located between a surge characteristic S and a choke characteristic C.

Each capacity line $X_{00}$, $X_{02}$, $X_{05}$, $X_{07}$, $X_{10}$ assigns each reduced mass flow $\dot{m}_1$, $\dot{m}_2$, $\dot{m}_3$, $\dot{m}_4$ exactly one single pressure ratio $q_1$, $q_2$, $q_3$, $q_4$.

Each capacity line $X_{00}$, $X_{02}$, $X_{05}$, $X_{07}$, $X_{10}$ extends along the entire value range of the reduced mass flow $\dot{m}_1$, $\dot{m}_2$, $\dot{m}_3$, $\dot{m}_4$.

FIG. 19 shows, using a performance map for the first compressor $V_1$ as an example, that for a given reduced mass flow $\dot{m}_1$ a plurality of individual pressure ratios $q_1$ is possible. A capacity line, for example, capacity line $X_{05}$, then determines how the compressor for a certain capacity factor within the series is to be regulated for the series to work as efficiently as possible. It can be seen that the capacity line $X_{05}$ does not run exactly in the center of the maximum and minimum single pressure ratios (marked by circles in FIG. 19) that are possible for a given reduced mass flow $\dot{m}_1$.

Example for Calculating the Input and Discharge States Above a Compressor and for Determining the Control Behavior and the arrangement of the Capacity Lines of the Compressor Series:

For a given inlet temperature (4.05K) and a given inlet pressure (24 mbar) at the first compressor $V_1$ and a given capacity factor X=0, which lies on the capacity line $X_{00}$, the single pressure ratio $q_1$ for all reduced mass flows and all (reduced) speeds is calculated: Based on FIG. 19, a reduced mass flow $\dot{m}_1$ of 0.3 results in a reduced speed $n_1$ of 0.53.

The (absolute) speed is calculated according to the formula for the conversion from reduced to absolute speeds to 600 Hz:

$$n_{abs} = n_{red} \cdot n_{Design} \cdot \sqrt{\frac{T_{actual}}{T_{Design}}}$$

Wherein $n_{abs}$ is the absolute speed, $n_{red}$ is the reduced speed (in this case $n_1$) and $n_{design}$, is the speed, for which the compressor was designed. $TT_{actual}$ is the actual temperature of the fluid, and $T_{design}$ is the delivery temperature or design temperature of the compressor. Based on the reduced mass flow $\dot{m}_1$ the (absolute) mass flow is calculated from the following formula to 16 g/s:

$$\dot{m}_{red} = \frac{m_{actual}}{m_{Design}} \cdot \frac{p_{Design}}{p_{actual}} \cdot \sqrt{\frac{T_{actual}}{T_{Design}}}$$

wherein $\dot{m}_{red}$ is the reduced mass flow through the compressor, $\dot{m}_{ist}$ is the current mass flow, $\dot{m}_{Design}$ refers to the mass flow, for which the respective compressor is designed, $p_{design}$ constitutes the design pressure at the respective compressor, $T_{design}$ is the design temperature, and $p_{actual}$ is the actual inlet pressure on the respective compressor.

The assumption is that the diameter of the compressor wheel of the compressor $V_1$ is, for example, 100 mm. Now, based on the diameter and the absolute speed, a peripheral speed at π*100 mm*60 Hz=188.49 m/s is calculated.

Hereinafter, a flow rate is calculated, in particular the tangential flow rate in compressor $V_1$. Since the exit face of the compressor wheel is known, the flow rate can be calculated by means of the fluid density at the output of compressor $V_1$. However, the density is a function of the discharge conditions (in particular of the pressure and the temperature). Therefore, this step is calculated iteratively, as will be explained in the following. The density is assumed to be 0.27 kg/m³ for example. I.e. based on 16 g/s, the density of 0.27 kg/m³ and the exit face of the compressor, a flow rate of the fluid can be calculated. By adopting a flow angle (for example, based on the geometry of the compressor wheel), the tangential flow rate is based on the flow rate of the fluid.

By means of the turbo machine equation (Euler equation) the enthalpy increase is calculated based on the product of the tangential flow rate and the peripheral speed of the compressor wheel.

The enthalpy increase at compressor $V_1$ is converted into a temperature increase by means of the known heat capacity of the fluid. Furthermore, the efficiency of compressor $V_1$ at the respective operating state (reduced speed $n_1$, reduced mass flow $\dot{m}_1$) is established in the performance map. The pressure increase results from the temperature increase and the efficiency of the compressor at the respective operating state.

Thus, the discharge temperature $T_1$ and the discharge pressure $P_1$ of the first compressor $V_1$ of the series are established. Next, the density of the fluid is calculated based on these two variables, and then compared with the originally assumed density value. If the density values deviate from one another, the previous steps for calculating the density (in particular by variation of the assumed density) are repeated until the calculated density corresponds to the assumed density. As already mentioned above, discharge pressure $P_1$ and discharge temperature $T_1$ form the inlet state of the subsequent compressor $V_2$.

It is assumed that $T_1$=9K and $p_1$=100 mbar. The (absolute) mass flow is the same for all compressors, i.e. equals 16 g/s. Based on these variables and capacity factor X), discharge temperature $T_2$, and discharge pressure $p_2$ of the second compressor $V_2$ of the series are calculated analogously to the procedure above. Using this model, the behavior of the compressor series $V_1$, $V_2$, $V_3$, $V_4$ can be pre-calculated for all capacity factors X and distributions of capacity lines $X_{00}$, $X_{02}$, $X_{05}$, $X_{07}$, $X_{10}$ in the performance maps. The run and the arrangement of capacity lines $X_{00}$, $X_{02}$, $X_{05}$, $X_{07}$, $X_{10}$ in the respective performance map of the respective compressor $V_1$, $V_2$, $V_3$, $V_4$ can thus be optimized using this calculation model of the compressor series.

Alternatively, in order to use the Euler equation, tables can be generated by generating a table from each performance map and reading the pressure ratios out of this table as a function of the reduced mass flow and the reduced speed.

Examples for the Calculation of the Proportional Integral Value PI:

In the method according to the invention, a PI controller (proportional integral controller) establishes in particular a proportional value prop from the difference between the desired inlet pressure $p_{desired}$ and the actual inlet pressure $p_{actual}$ at the first compressor $V_1$ of the series. In transient operation, i.e., for example, when starting up the system (pump down), the desired inlet pressure $p_{desired}$ is smaller than the actual inlet pressure $p_{actual}$. Now, the proportional value prop is the difference between the desired and the actual inlet pressure, multiplied by an amplification factor k:

$$prop=-k(p_{desired}-p_{actual}).$$

In addition, the PI controller calculates an integral value $int_{t=n+1}$ based on this proportional value. Hereby, the proportional value prop is multiplied by a cycle time $\Delta t$, divided by an integral time T, and added to the integral value of the preceding cycle $int_{t=n}$:

$$int_{t=n+1} = int_{t=n} + prop \cdot \frac{\Delta t}{T}$$

Theoretically, the capacity factor X can adopt values between 0 ($X_{surge}$=0, surge regime) and 1 ($X_{choke}$=1, choke regime). In order for the compressor to not be driven into these regimes, the capacity factor X is limited to values between the minimum value $X_{min}=X_{surge}+0.05$ and the maximum value $X_{max}=X_{choke}-01$.

In the same way, an upper and a lower limit value $int_{max}$ and $int_{min}$ of the integral value int are derived from $X_{max}$ or $X_{min}$ and from the natural logarithm of the total pressure ratio $\ln(\pi_{actual})$:

$$int_{max}=X_{max}+\ln(\pi_{actual}),$$

$$int_{min}=X_{min}+\ln(\lambda_{actual}).$$

Since the measured actual total pressure ratio $\pi_{actual}$ continuously increases in transient operation (pump down) (the actual inlet pressure $p_{actual}$ continuously decreases), the limit values of the integral value consequently continuously increases as well. In the reverse case (pump up), i.e. when the desired inlet pressure $p_{desired}$ is smaller than the actual inlet pressure $p_{actual}$, these limit values continuously decrease.

When the integral value $int_{t=n+1}$ becomes bigger or smaller than the upper or lower limit value $int_{max}$, $int_{min}$, it is limited to the respective limit value.

Proportional value prop and integral value $int_{t=n+1}$ are added to generate the proportional integral value PI.

$$PI=prop+int_{t=n+1}$$

When all compressors $V_1$, $V_2$, $V_3$, $V_4$ run in series at their design points, the compressor system reaches its design or working point at a design total pressure ratio $\pi_{design}$.

When the proportional integral value PI is smaller than the sum of the maximum value of the capacity factor $X_{max}$ and of the natural logarithm of the design total pressure ratio $\pi_{design}$, the capacity factor X is calculated based on the difference of the proportional integral value PI and the natural logarithm of the actual total pressure ratio $\pi_{actual}$. Otherwise, the proportional integral value PI is limited to the sum of the natural logarithm of the design total pressure ratio $\pi_{design}$ and the maximum value of the capacity factor $X_{max}$, in particular for the calculation of the capacity factor X, i.e.:

$$X = PI - \ln(\pi_{actual}), \quad \text{if } PI < \ln(\pi_{design}) + X_{choke}$$
$$X = \ln(\pi_{design}) + X_{choke} - \ln(\pi_{actual}) \quad \text{otherwise}$$

Based on the thus calculated capacity factor X, a decision is made, based on the method according to the invention, as to how the model total pressure ratio $\pi_{model}$ is established. As described above, the model total pressure ratio $\pi_{model}$ equals the actual total pressure ratio $\pi_{actual}$, when the thus determined capacity factor X lies between the minimum value and the maximum value $X_{min}$, $X_{max}$. If the capacity factor X is outside this value range, the model total pressure ratio $\pi_{model}$ changes as described above by means of a saturation function. Next, the capacity factor X is limited to its minimum value or maximum value $X_{min}$, $X_{max}$, and then, in particular together with the model total pressure ratio $\pi_{model}$ passed on to the control function F, which determines the reduced desired speed $n_1$, $n_2$, $n_3$, $n_4$ for the respective compressor $V_1$, $V_2$, $V_3$, $V_4$ based on these arguments.

The reduced desired speeds $n_1$, $n_2$, $n_3$, $n_4$ for each compressor $V_1$, $V_2$, $V_3$, $V_4$ can, in particular, be recorded in a table (look-up table). This table can, in particular, be created by means of model calculations. According to the capacity factor X and the model total pressure ratio $\pi_{model}$, in particular a software for reading out the reduced desired speeds $n_1$, $n_2$, $n_3$, $n_4$ from the table can be used.

Instead of a PI controller, a PID (proportional integral derivative) controller can be used. This is in particular advantageous when the mass flow volumes to be controlled are smaller than the volumes in cooling systems of the type described above, as rapid fluctuations in these relatively large volumes are rather rare. When small volumes are to be controlled, it is advantageous to also have a fast-reacting controlling component, such as a PID controller, which reacts faster than a PI controller due to its differentiating component.

LIST OF REFERENCE SYMBOLS

| Symbol | Description |
| --- | --- |
| $V_1$, $V_2$, $V_3$, $V_4$ | first, second, third and fourth compressor |
| $n_1$, $n_2$, $n_3$, $n_4$ | first, second, third and fourth reduced (desired) speed |
| $n_{abs}$ | absolute speed |
| $n_{design}$ | design speed |
| $p_{actual}$ | actual inlet pressure at the first compressor |
| $p_{desired}$ | desired inlet pressure at the first compressor |
| $p_1$, $p_2$, $p_3$, $p_4$ | discharge pressure downstream of the first, second, third, and fourth compressor |
| $T_{actual}$ | actual temperature at the inlet of the first compressor |
| $T_{design}$ | design temperature |
| $T_1$, $T_2$, $T_3$, $T_4$ | temperature at the output of the first, second, third, and fourth compressor |
| $\dot{m}_1$, $\dot{m}_2$, $\dot{m}_3$, $\dot{m}_4$ | reduced mass flow through the first, second, third, and fourth compressor |
| X | capacity factor |
| $X_{max}$ | maximum value of the capacity factor |
| $X_{min}$ | minimum value of the capacity factor |
| $X_{choke}$ | choke capacity factor |
| $X_{surge}$ | surge capacity factor |
| $X_{00}$, $X_{02}$, $X_{05}$, $X_{10}$ | capacity lines |
| prop | proportional value |
| int | integral value |
| PI | proportional integral value |
| $\pi$ | total pressure ratio |
| $\pi_{model}$ | model overall pressure ratio |
| $\pi_{actual}$ | actual total pressure ratio |
| $\pi_{design}$ | design total pressure ratio |
| F | regulation function |
| S | surge characteristic |
| C | choke characteristic |

The invention claimed is:

1. A method for controlling the speeds of compressors arranged in series that are formed to compress a fluid, comprising:
   Specifying a desired inlet pressure which the fluid should have at an entry of the compressor arranged the furthest upstream,
   Recording an actual inlet pressure of the fluid at said entry,
   Recording an actual discharge pressure of the fluid at an output of the compressor arranged the furthest downstream, Establishing an actual total pressure ratio, wherein the actual total pressure ratio corresponds to the quotient of the actual discharge pressure and the actual inlet pressure, Determining a proportional integral value based on the deviation of the actual inlet pressure from the desired inlet pressure, Determining the capacity factor of the proportional integral value and the actual total pressure ratio, Establishing a model total pressure ratio based on the actual total pressure ratio and the capacity factor, Determining a reduced desired speed for each compressor, wherein the respective reduced desired speed is determined as a function value of a control function associated with the respective compressor, which control function assigns a reduced desired speed to each value pair consisting of capacity factor and model total pressure ratio, and Converting the reduced desired speeds into target speeds and adjusting the speed of each compressor to the respectively assigned target speed.

2. The method according to claim 1, wherein the proportional integral value is less than or equal to the sum of the natural logarithm of a design total pressure ratio and of a choke capacity factor, wherein the choke capacity factor is 1 and wherein the design total pressure ratio is the total pressure ratio which results when all compressors of the series are operated at their design points, wherein the design point of a compressor defines the operating state in which the respective compressor has its highest efficiency.

3. The method according to claim 1, wherein the capacity factor corresponds to the difference between the proportional integral value and the natural logarithm of the actual total pressure ratio.

4. The method according to claim 1, wherein a maximum value and minimum value for the capacity factor is defined, wherein the maximum value is between 0.8 and 1 and/or the minimum value is between 0 and 0.1.

5. The method according to claim 4, wherein the model total pressure ratio corresponds to the actual total pressure ratio multiplied by a saturation function that is dependent on the capacity factor, wherein the saturation function is 1 when the capacity factor is between the minimum value and the maximum value, and wherein the saturation function corresponds to an exponential function of the difference of the capacity factor and the minimum value, when the capacity factor is less than the minimum value, and wherein the saturation function corresponds to an exponential function of the difference of the capacity factor and the maximum value when the capacity factor is greater than the maximum value.

6. The method according to claim 5, wherein, when the capacity factor is greater than the maximum value, the capacity factor is equated to the maximum value, after the model total pressure ratio is determined, and that, when the capacity factor is less than the minimum value, the capacity factor is equated to the minimum value, after the model total pressure ratio is determined.

7. The method according to claim 1, wherein the discharge temperature of the fluid at the output of the respective compressor is equal to the inlet temperature of the fluid at the entry of the compressor of the series arranged respectively downstream of the respective compressor, and that the discharge pressure of the fluid at the output of the respective compressor is equal to the inlet pressure of the fluid at the entry of the compressor of the series arranged respectively downstream of the respective compressor.

8. The method according to claim 7, wherein the discharge temperature and the discharge pressure for each compressor are established based on the inlet pressure and the inlet temperature of the compressor of the series arranged the furthest upstream, in particular using an Euler equation of a turbo machine equation, wherein the reduced speed for each compressor and the reduced mass flow rate is established by means of the respective compressor as a function of the total pressure ratio and the capacity factor of the series.

9. The method according to claim 8, wherein a plurality of capacity lines are set for each compressor, wherein each capacity line is a function of the total pressure ratio for each compressor, and a function of the reduced mass flow rate and of the reduced speed of the respective compressor, and wherein the capacity factor along the respective capacity line is constant for each compressor.

10. The method according to claim 9, wherein the control function establishes the reduced desired speed based on a pre-calculated table, wherein the table for each capacity factor, which is located on a capacity line and for each total pressure ratio, exhibits the respective reduced speed and wherein for capacity factors and for total pressure ratios that are not listed in the table, the corresponding values for the reduced speeds of the respective compressor are established by means of an interpolation method.

11. The method according to claim 9, wherein the capacity lines exhibit those pairs of values of reduced mass flow and reduced speed that effect for the actual inlet pressure to adapt to the desired inlet pressure, when the control function from the model total pressure ratio and the capacity factor establish a reduced desired speed for each compressor, from the pre-calculated table, and the control is carried out with the established reduced speeds.

12. The method according to claim 9, wherein the capacity lines are located between a surge and a choke characteristic, wherein the surge characteristic comprises operating states of the respective compressor in which, in case of a given reduced speed and a given reduced mass flow, a single pressure ratio to be reached cannot be maintained, and wherein the choke characteristic comprises operating states of the compressor, in which, in case of a defined reduced desired speed of the respective compressor, a decrease of the respective single pressure ratio does not result in a significantly increased reduced mass flow through the respective compressor.

* * * * *